(12) United States Patent
Brower et al.

(10) Patent No.: US 6,357,001 B1
(45) Date of Patent: Mar. 12, 2002

(54) METHOD FOR INSTALLING A HARD DRIVE INTO A COMPUTER AND IMPROVED COMPONENTS THEREFOR

(75) Inventors: Charles Brower, Irvine; Curt Brown, Yorba Linda; Charles Hohman, Mission Viejo, all of CA (US)

(73) Assignee: CMS Peripherals, Inc., Costa Mesa, CA (US)

( * ) Notice: Subject to any disclaimer, the term of this patent is extended or adjusted under 35 U.S.C. 154(b) by 0 days.

(21) Appl. No.: 09/243,316

(22) Filed: Feb. 2, 1999

Related U.S. Application Data

(60) Provisional application No. 60/073,416, filed on Feb. 2, 1998.

(51) Int. Cl.[7] ................................................. G06F 3/00
(52) U.S. Cl. ......................... 713/1; 206/308.3; 206/720
(58) Field of Search .............................. 713/1; 206/307, 206/308.3, 701, 709, 719, 720

(56) References Cited

U.S. PATENT DOCUMENTS 5,540,597 A * 7/1996 Budman et al. ............... 439/77
5,944,182 A * 8/1999 Williams et al. ......... 206/308.3

* cited by examiner

Primary Examiner—Thomas M. Heckler
(74) Attorney, Agent, or Firm—William G. Lane

(57) ABSTRACT

An improved method of installing a new hard drive in a computer comprising packaging a new hard drive with a connected hard drive connector assembly having a hard drive PCMCIA connector in a static dissipation bag having a conductive coating on its exterior surface; grounding the static dissipation bag by connecting the bag to the computer and to an operator, extending the PCMCIA connector outside the bag, connecting the new hard drive via the PCMCIA connector to the PCMCIA or equivalent port of a computer, transferring the data on the computer to the new hard drive, disconnecting the PCMCIA connector from the computer, removing the new hard drive from the static dissipation bag, disconnecting the hard drive connector assembly from the new hard drive, and installing the new hard drive in the computer.

17 Claims, 14 Drawing Sheets

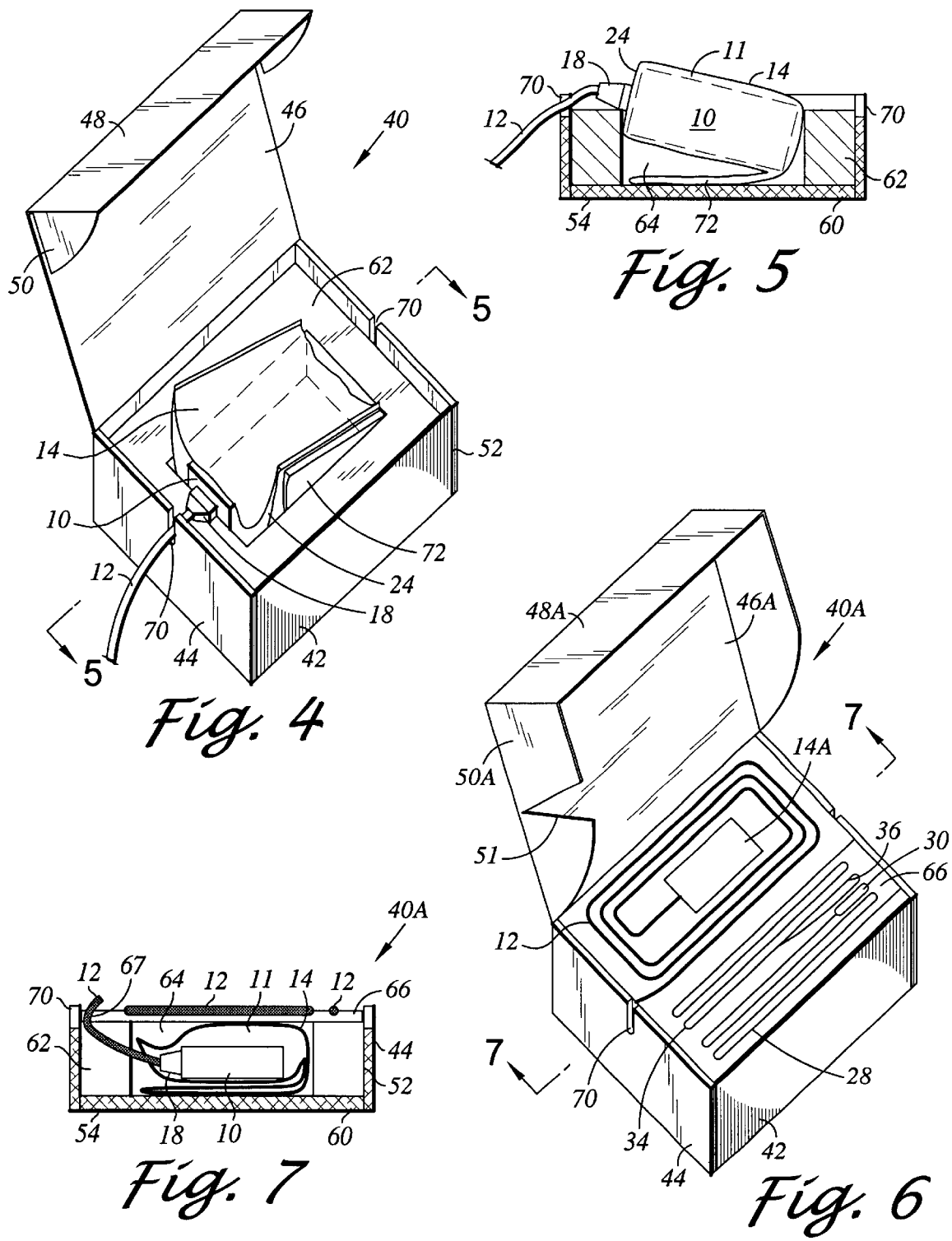

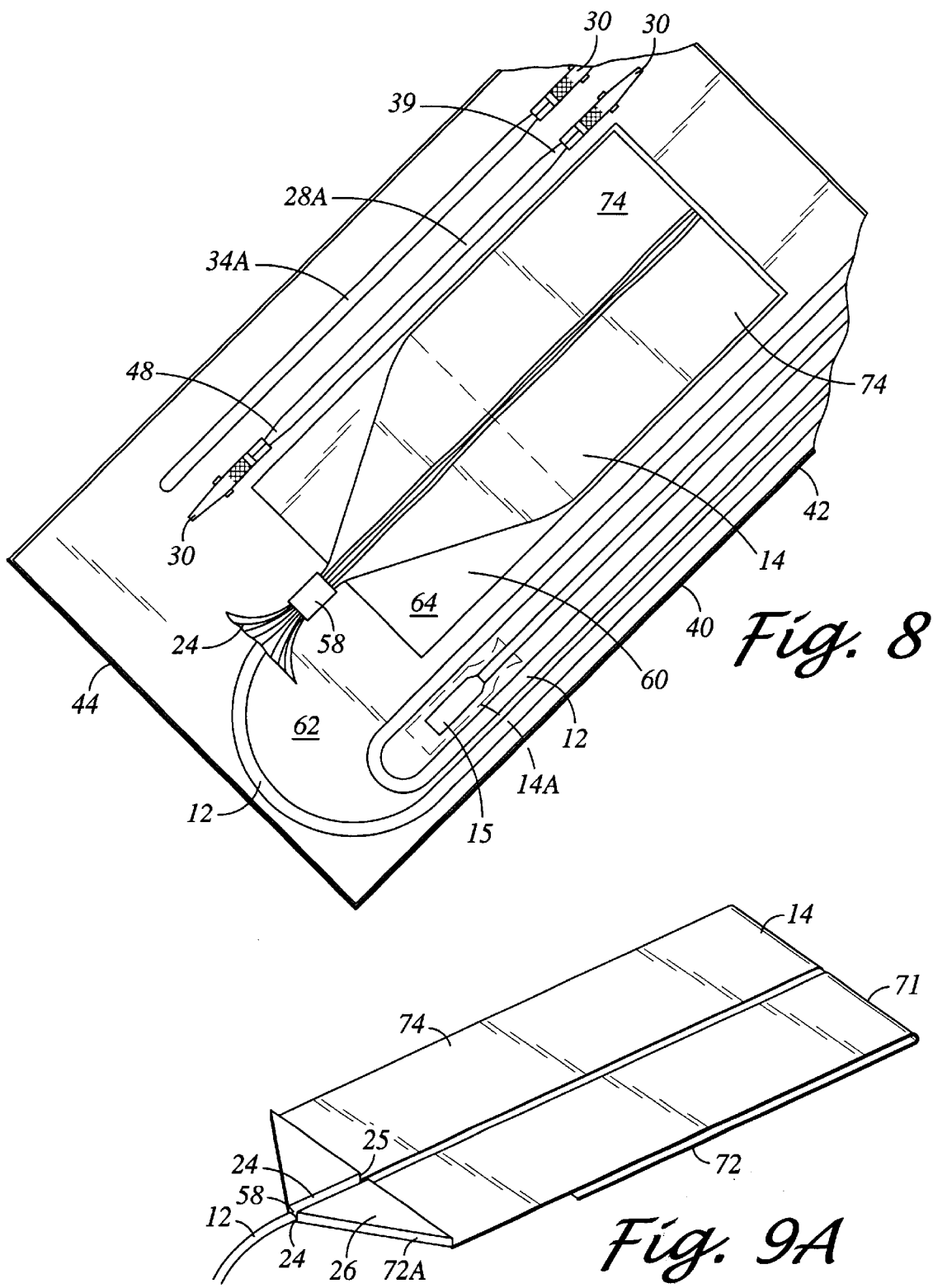

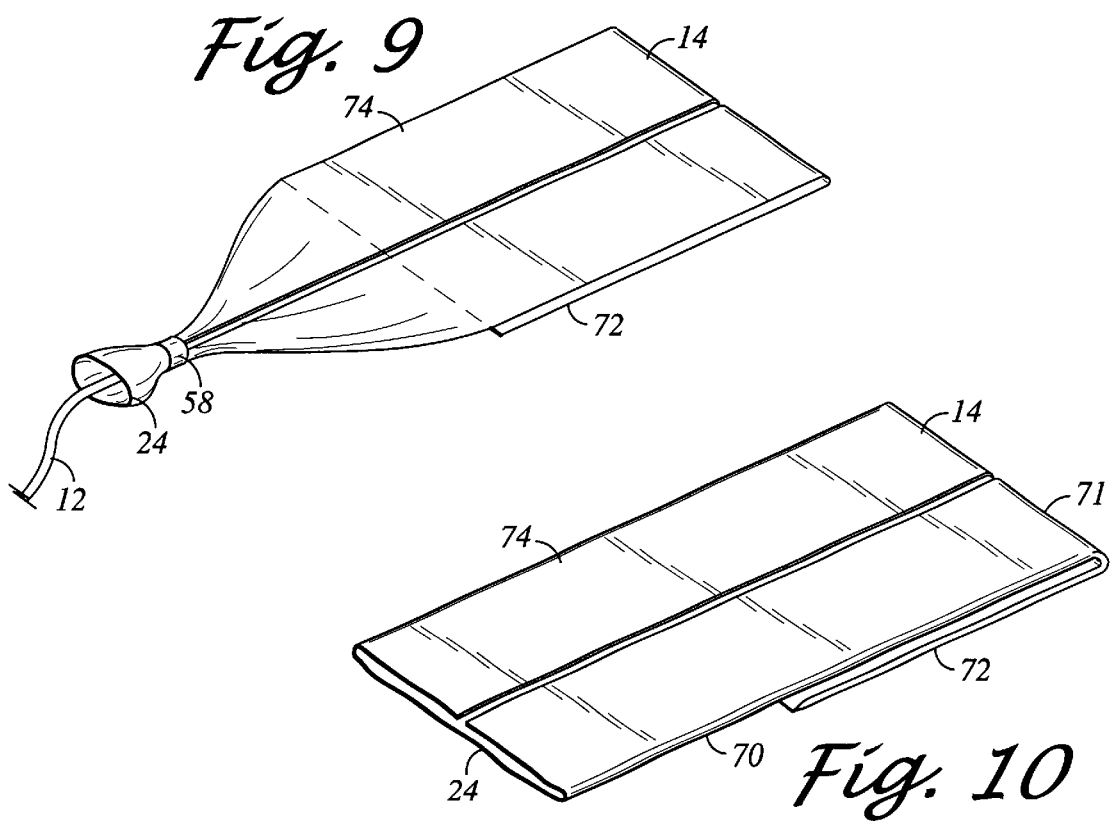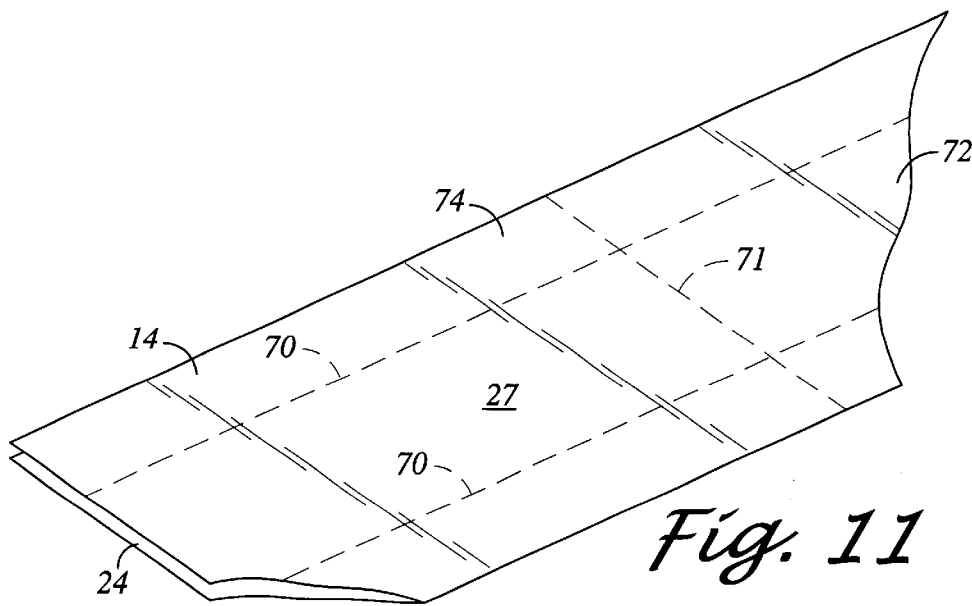

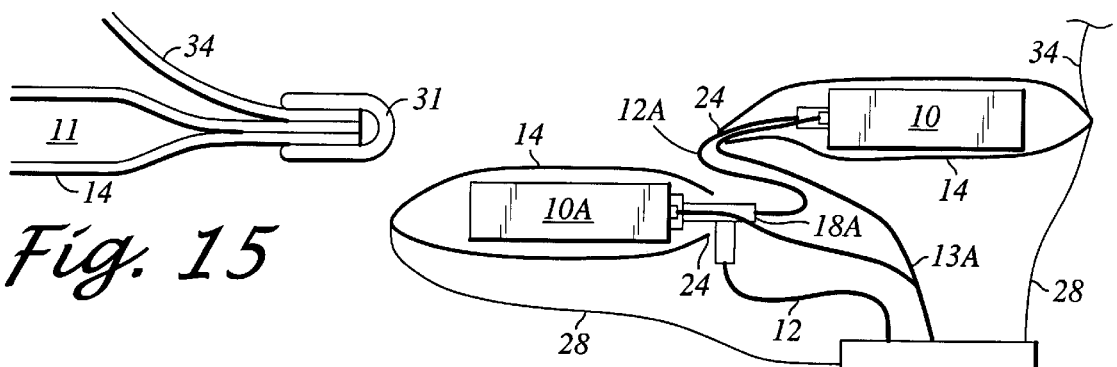
Fig. 15
Fig. 14
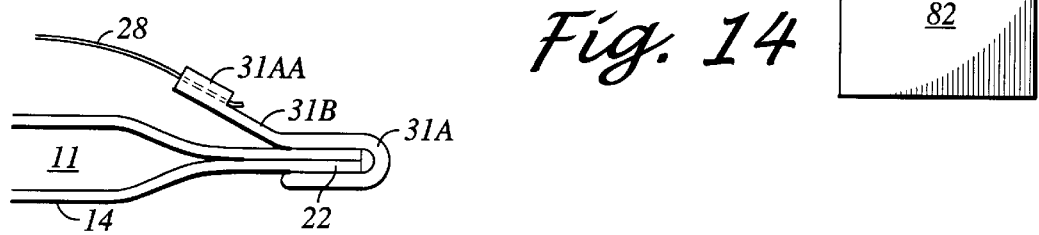
Fig. 16
Fig. 17
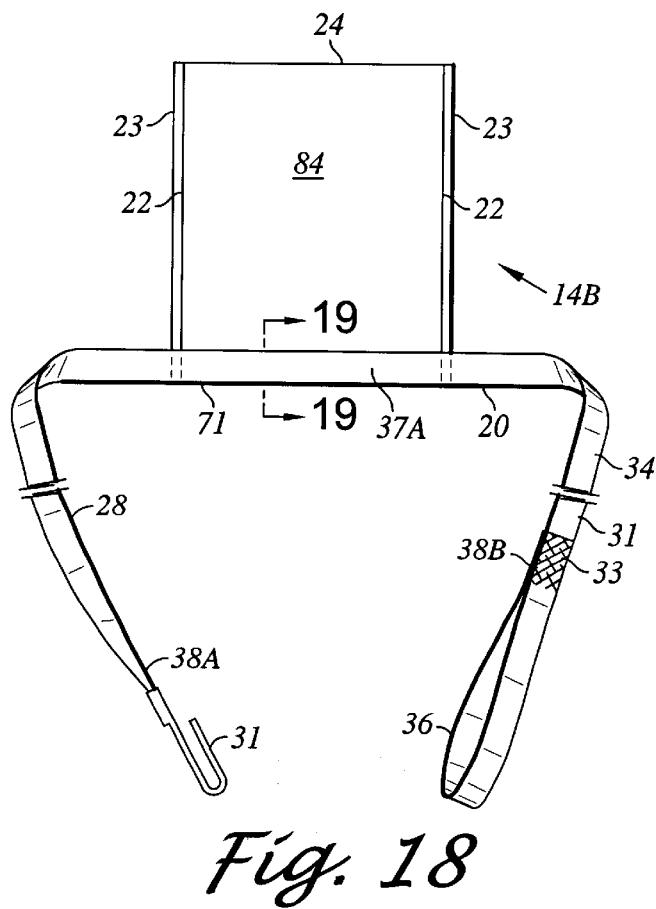
Fig. 18
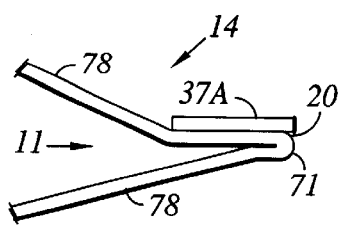
Fig. 19

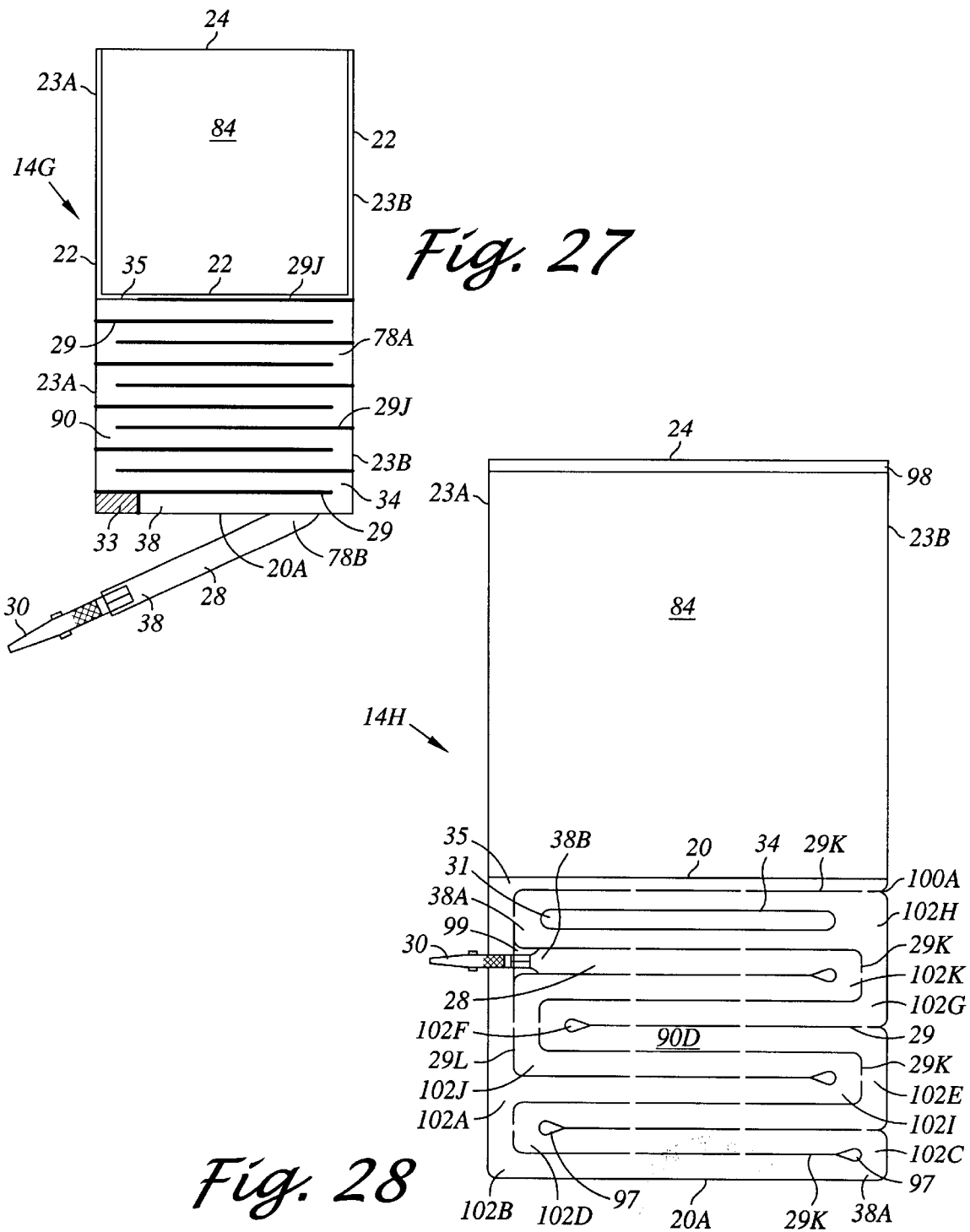

METHOD FOR INSTALLING A HARD DRIVE INTO A COMPUTER AND IMPROVED COMPONENTS THEREFOR

Applicants claim the benefit of prior filed co-pending Provisional Patent Application Serial No. 60/073,416 for Improved Method For Installing A Hard Drive Into A Computer And Improved Components Therefor filed on Feb. 2, 1998. This is a Continuation-in-Part of said Provisional Application Serial No. 60/073,416.

FIELD OF THE INVENTION

The present invention is directed to an improved static dissipation bag for a hard drive and other electronic components, an improved method of installing a hard drive or other electronic component into a computer or other electronic device, and a low-cost back-up system.

BACKGROUND OF THE INVENTION

There have been many advances in the computer industry over the last decade including remarkable improvements to microprocessors, their capacities, their speeds of operation, increased RAM capacities for desktop and laptop computers, and dramatic increases in memory capacity, the speed of operation of hard disks, and the mother boards. Although replacement or substitution of the microprocessing chip with a more powerful chip normally requires replacing the mother board in a computer, the RAM memory can be easily upgraded, and is continually upgraded in computers. Likewise, the hard disk memory can be increased by adding or substituting a new hard drive into a computer to increase not only the hard drive memory but also the hard drive operational speeds. With the increase in the memory requirements for software, the computer bought today frequently must be upgraded with increased RAM and/or hard drive memory a year later to take advantage of the newest software.

When the hard drive of an existing computer is to be substituted with an upgrade, most typically, the data on the old hard drive is backed up to an external source, such as a network, tape drive, recordable CD, zip drive, or the like The old drive is removed and the new hard drive is installed. The Microsoft Windows operating system, or less frequently, an alternative operating system, is then installed. Finally, the data on the back-up source is then transferred to the new drive.

In the present invention, when the hard drive of an existing computer is to be substituted with an upgrade, i.e., a hard drive with greater memory and/or operating speed, the data on the existing hard drive is transferred to the new hard drive directly, preferably prior to removal of the old hard drive and installation of the new hard drive. This method is used by a few hard drive manufacturers. However, this method can be fraught with certain difficulties. Electronic components and the computer can build up electric static charges. Electrostatic discharge can damage computer components, the new and old hard drive, the write and read heads on the hard drives, and the like. Thus, it is important to dissipate electrostatic charge safely and under controlled conditions, rather than having an accidental electrostatic discharge that can damage the computer and/or its components, During the data transfer from the existing hard drive in the computer to the new hard drive, which resides outside the computer during the data transfer step, shock movement to the new hard drive cannot only damage components of the hard drive, including the disks covered with magnetic coating and the recording and reading heads, but it also can move the recording head, causing a data write error. After the data transfer has taken place (which can be quite lengthy when there is a great deal of data to be transferred), the computer operating system authenticates successful transfer of the data, and if it finds an error in the data transfer, the data transfer step must be re-run. If the magnetic material on the disks has been damaged, the hard drive will have to be reformatted or replaced, and if one or more of the recording heads has been damaged, the hard drive will have to be replaced.

SUMMARY OF THE INVENTION

The present invention is directed to an improved method of shipping and installing a new hard drive in a computer comprising the steps of packaging a new hard drive in a static dissipation bag having a conductive coating on its exterior surface; boxing the packaged new hard drive in a shock-absorbing medium within a transportation box, connecting the new hard drive to the PCMCIA port, or equivalent port, of a computer, transferring the data on the existing hard drive in the computer to the new hard drive while the new hard drive is packaged in the static dissipation bag and boxed in the shock-absorbing medium within the transportation box; disconnecting the new hard drive from the computer port after the data transfer is complete; grounding the static dissipation bag to the computer and to an operator, the operator removing the packaged new hard drive from the transportation box and the static dissipation bag and installing it in the computer.

The method can be used to replace an existing hard drive with a new hard drive.

The new hard drive can be placed on the surface of the static dissipation bag by the operator after the static dissipation bag is grounded to the computer and the operator. The new hard drive installation is carried out by the grounded operator. The existing hard drive can then be removed from the computer by the grounded operator and placed on the surface of the static dissipation bag. The new hard drive is installed in the computer by the grounded operator. The existing hard drive can be packaged in the static dissipation bag by the operator. The existing hard drive can also be boxed in the shock-absorbing medium within the transportation box. The existing hard drive can also be packaged in the static dissipation bag by the operator after removal of the existing hard drive from the computer and before installation of the new hard drive in the computer.

The new hard drive can be connected to the first end of a connector cable and the new hard drive and the connected first end of the connector cable can be packaged in the static dissipation bag with the second end of the connector cable extending out from the static dissipation bag. The second end of the connector cable can be packaged within a second static dissipation bag for added protection against static charge. The second end of the connector cable is connected to the PCMCIA or equivalent port of the computer to effect the data transfer from the existing hard drive to the new hard drive. The first end of the connector cable is disconnected from the new hard drive after the data transfer from the existing hard drive has been completed. Thereafter, the first end of the connector cable can be connected to the existing hard drive and the existing hard drive and the connected connector cable can be packaged in the static dissipation bag after installation of the new hard drive in the computer. The packaged existing hard drive can be boxed in the shock-absorbing medium within the transportation box.

The existing hard drive packaged in the static dissipation bag and boxed in the shock-absorbing medium ("stored hard drive") can be used as a back up hard drive. The second end of the connector cable of the stored hard drive is connected to the PCMCIA or equivalent port of a computer; the data stored in the computer to be backed up is transferred to the stored hard drive while the stored hard drive is packaged in the static dissipation bag and boxed in the shock-absorbing medium within the transportation box. After the data transfer to the stored hard drive, the connector cable is disconnected from the computer. The static dissipation bag can be optionally grounded to the computer prior to and/or during the data transfer step.

The present invention is also directed to an improved method of shipping and storing a back-up hard drive for a computer comprising the steps of: packaging a hard drive in a static dissipation bag having a conductive coating on its exterior surface; boxing the packaged hard drive ("back-up hard drive") in a shock-absorbing medium within a transportation box; connecting the back-up hard drive to the PCMCIA or equivalent port of a computer; transferring the data on the existing hard drive in the computer to the back-up hard drive while the back-up hard drive is packaged in the static dissipation bag and boxed in the shock-absorbing medium within the transportation box; disconnecting the back-up hard drive from the computer after the data transfer is complete.

The static dissipation bag can be grounded to the computer prior to or during the data transfer step. The first end of a connector cable with first and second ends can be connected to the back-up hard drive, and the back-up hard drive and the connected connector cable can be packaged in the static dissipation bag with the second end of the connector cable extending out of the static dissipation bag. The second end of the connector cable of the hard drive is connected to the PCMCIA or equivalent port of the computer to effect the data transfer.

The improved method of installing a hard drive in a computer utilizes the shipping container with its shock-absorbing material, and an improved static dissipation bag, as a temporary housing for the new hard drive during data transfer and using the static dissipation bag as a static dissipating work surface during the installation step for the new hard drive.

It is an object of the present invention to package and box the old hard drive in the improved static dissipation bag and the shipping container and to utilize the packaged and old hard drive as a back-up system.

As with most conventional hard drives, the hard drive in the present method is shipped in a transportation box, normally a cardboard or corrugated cardboard box containing polymeric foam sponge. The hard drive is shipped within a static dissipation bag, conventionally a Mylar® bag having an external coating of metallic material to prevent static buildup on the exterior of the bag. The polymeric foam sponge padding in the transportation box acts as a shock absorber to prevent damage to the hard drive during transportation.

In the preferred embodiment, the connector cable is attached to the new hard drive, and the combination is shipped in the static dissipation bag with one end of the connector cable extending out of the bag in the transportation box. Optionally, the new hard drive and connected connector cable can be packaged in the static dissipation bag and the bag opened when the new hard drive is connected to the computer for data transfer. The operator opens the transportation box, which may have a hinged top, and removes the free end of the connector cable, preferably residing on the top of the polymeric foam sponge or between layers of the foam sponge. The free end, i.e., second end, of the connector cable, which has its other end, i.e., first end, attached to the hard drive is connected to the computer at the PCMCIA or equivalent port. Preferably, the free end of the connector cable is shipped in a small static dissipating or dissipation bag which is removed before connecting it to the computer port. The static dissipation bag housing the new hard drive and the attached end of the connector cable is preferably not opened until the data transfer is complete. The computer is started up and the data from the existing hard drive on the computer is transferred to the new hard drive. During the transfer of data from the old hard drive to the new hard drive, the new hard drive is maintained in the static dissipation bag to protect against static charge buildup and discharge and to protect against EMF surges, and is kept in the foam padding in the shipping container to minimize shock movement. Alternatively, the new hard drive can be taken out of the bag and laid on top of the bag with both residing in the polymeric foam sponge of the transportation box. In this latter embodiment, the bag is grounded to the operator and the computer by conductive leads.

The improved static dissipation bag has one or two conductive or attachment leads conductively attached or connected to the bag; optionally three or more conductive leads can be conductively attached or connected to the bag. Separate conductive leads have alligator clips and/or conductive adhesive, or similar conductive attachment means, at one end of each lead to attach or connect each lead to the bag. Prior to removing the old hard drive from the computer and installing the new hard drive, the free end of a conductive lead is connected to a metallic part on the computer chassis to ground the static dissipation bag with respect to the computer, and a conductive lead is connected to the operator, such as to the wrist of the operator, to ground the operator with respect to the static dissipation bag. Alternatively, one lead with attachment means can be used to connect the static dissipation bag to the computer and the operator.

After the conductive or attachment leads are attached to the operator, the bag and the computer, the bag, which is quite a bit larger than the electronic component, e.g., the hard drive, is opened to form a working surface. The bag is opened and the new hard drive is removed from the bag; the bag is unfolded and flattened out to form a work surface; and the drive is placed on the static dissipation bag work surface. The old hard drive is removed from the computer and placed on the static dissipation bag work surface. The new hard drive is then installed into the computer; the computer is closed up (the conductive or attachment lead to the computer and the operator is preferably left on until the computer is closed up, and the old hard drive, with or without the connector cable, is placed into the static dissipation bag. At this stage, the conductive leads can be disconnected from the operator and the computer; the computer can be started in its normal mode since it will recognize the new hard drive; and the new hard drive has all the data, application software, and operation software required for the operation and functioning of the computer.

The old hard drive can be used as a back-up hard drive by maintaining the hard drive with the connector cable in the static dissipation bag in the box. When the old hard drive is to be used as a back-up, the free end of the connector cable with the PCMCIA card is attached to the PCMCIA or equivalent port in the computer and the normal back-up operation is carried out on the old hard drive. After the back-up operation is complete, the old hard drive connector cable is removed from the computer and stored in the transportation box. Optionally, if the new hard drive was shipped with a small static dissipation bag housing the PCMCIA card, this bag can be used again to house the PCMCIA card and connector cable of the old hard drive to prevent static discharge damage to the old hard drive. Optionally, the conductive leads can be attached to the operator and computer prior to or during the data transfer step of a back-up operation.

The present invention is also directed to an improved static dissipation bag with an integral conductive lead comprising a bag having a polymeric film envelope portion and a contiguous field of polymeric film extending from a first side of the envelope portion of the bag, the polymeric film envelope having an external conductive coating, three sealed sides and an open side opening into a central chamber for storing items, the polymeric field of film having an external conductive coating, a connecting side connected to the envelope and an opposing remote side, a first edge and an opposing second edge both running from the connecting side to the remote side, the field of film having first and second sets of tear lines, the first and second sets of tear lines spaced apart and inter-disposed between each other, the first set of tear lines extending from the first edge toward the second edge and terminating before reaching the second edge and the second set of tear lines extending from the second edge towards the first edge and terminating before reaching the first edge to create a zigzag conductive lead of polymeric film extending from the envelope. The conductive lead has attachment means connected to the field of polymeric material about halfway between the connecting side and the remote side and a second attachment means connected to the field of polymeric field at the free end of the of the conductive lead.

In another embodiment of the present invention the static dissipation bag with an integral conductive lead comprises a bag having a polymeric film envelope portion and first and second fields of polymeric film extending from the first and second sealed sides of the envelope portion of the bag, the polymeric film envelope having an external conductive coating, first, second and third sealed sides and an open side opening into a central chamber for storing items, the first and second polymeric fields of film having an external conductive coating, a connecting side connected to the envelope and an opposing remote side, a first edge and an opposing second edge both running from the connecting side to the remote side, each of the first and second fields of film having first and second sets of tear lines, the first and second sets of tear lines spaced apart and inter-disposed between each other, the first set of tear lines extending from the first edge toward the second edge and terminating before reaching the second edge and the second set of tear lines extending from the second edge towards the first edge and terminating before reaching the first edge to create a zigzag conductive lead of polymeric film extending from the envelope.

In a further embodiment of the present invention the static dissipation bag with an integral conductive lead comprises a bag having a polymeric film envelope portion and a contiguous field of polymeric film extending from a first side of the envelope portion of the bag, the polymeric film envelope having an external conductive coating, first, second and third sealed sides and an open side opening into a central chamber for storing items, the polymeric field of film having an external conductive coating, a connecting side connected to the envelope and an opposing remote side, a first edge and an opposing second edge both running from the connecting side to the remote side, the field of film having first and second sets of tear lines, the first and second sets of tear lines spaced apart, inter-disposed between each other and parallel to and positioned near the remote side, the first set of tear lines extending from the first edge toward the second edge and terminating before reaching the second edge and the second set of tear lines extending from the second edge towards the first edge and terminating before reaching the first edge the connecting side to the remote side, the field of film having third and fourth sets of tear lines, the third and fourth sets of tear lines spaced apart and inter-disposed between each other and parallel to and positioned near the connecting side, a fifth tear line extending half way across the field from the connecting side toward the remote side parallel to the first and second sides, the third set of tear lines extending from the first edge toward the second edge and terminating before reaching the second edge and the fourth set of tear lines extending from the fifth tear line towards the first edge and terminating before reaching the first edge, the tear line of the first set of tear lines nearest the third set of tear lines extending from the fifth tear line to the first edge to create first and second zigzag conductive lead the field of polymeric film having lead of polymeric film to create a zigzag conductive leads of polymeric film extending from separate points on the envelope. the connecting side to the remote side, the field of film having first and second sets of tear lines, the first and second sets of tear lines spaced apart and interdisposed between each other, the first set of tear lines extending from the first edge toward the second edge and terminating before reaching the second edge and the second set of tear lines extending from the second edge towards the first edge and terminating before reaching the first edge to create a zigzag conductive lead of polymeric film.

In another embodiment of the present invention the static dissipation bag with an integral conductive lead comprises a bag having a polymeric film envelope portion and a contiguous field of polymeric film extending from a first side of the envelope portion of the bag, the polymeric film envelope having an external conductive coating, three sealed sides and an open side opening into a central chamber for storing items, the polymeric field of film having an external conductive coating, a connecting side connected to the envelope and an opposing remote side, a first edge and an opposing second edge both running from the connecting side to the remote side, and a first tear line running from the connected side to the remote side between the first side and the second side, the field of film having second and third sets of tear lines, the second and third sets of tear lines spaced apart and inter-disposed between each other, the second set of tear lines extending from the first edge toward the first tear line and terminating before reaching the first tear line and the third set of tear lines extending from the second edge towards the first tear line and terminating before reaching the first tear line to create a zigzag conductive lead of polymeric film extending from the envelope, and the field of film having fourth and fifth sets of tear lines, the fourth and fifth sets of tear lines spaced apart and inter-disposed between each other, the fourth set of tear lines extending from the first edge toward the first tear line and terminating before reaching the first tear line and the fifth set of tear lines extending from the second edge towards the first tear line and terminating before reaching the first tear line to create a zigzag conductive lead of polymeric film extending from the envelope.

In a still further embodiment, the static dissipation bag with an integral conductive lead comprises a bag having a polymeric film envelope portion and two contiguous fields of polymeric film superimposed on one another extending from the first sealed side of the envelope portion of the bag, the polymeric film envelope having an external conductive coating, three sealed sides and an open side opening into a central chamber for storing items, each of the two polymeric fields of film having an external conductive coating, a connecting side connected to the envelope and an opposing remote side, a first edge and an opposing second edge both running from the connecting side to the remote side, each of the two fields of polymeric film having first and second sets of tear lines, the first and second sets of tear lines spaced apart and inter-disposed between each other, the first set of tear lines extending from the first edge toward the second edge and terminating before reaching the second edge and the second set of tear lines extending from the second edge towards the first edge and terminating before reaching the first edge to create a zigzag conductive lead in each of the fields of polymeric film extending from the envelope.

In another embodiment of the present invention, a new hard drive is installed in a computer by packaging a new hard drive with a connected hard drive connector assembly having a PCMCIA connector in a static dissipation bag having a conductive coating on its exterior surface; grounding the static dissipation bag by connecting the bag to the computer and to an operator, extending the PCMCIA connector outside the bag, connecting the new hard drive via the PCMCIA connector to the PCMCIA or equivalent port of a computer, transferring the data on the existing hard drive in the computer to the new hard drive while the new hard drive is packaged in the static dissipation bag, disconnecting the PCMCIA connector from the PCMCIA or equivalent port after the data transfer is complete, removing the new hard drive from the static dissipation bag, disconnecting the hard drive connector assembly from the new hard drive, and installing the new hard drive in the computer. The new hard drive can replace the existing hard drive in the computer or be an add-on. After the data transfer, the new hard drive can be placed on the surface of the grounded static dissipation bag after the hard drive connector assembly is disconnected and the existing hard drive can then be removed from the computer and placed on the surface of the grounded static dissipation bag prior to installing the new hard drive in the computer.

The existing hard drive can be connected to the hard drive connector assembly and packaged in the static dissipation bag. The packaged existing hard drive can be boxed in a transportation box.

The hard drive connector assembly comprises a PCMCIA card having a PCMCIA connector for a PCMCIA port on a computer and a hard drive connector to connect the PCMCIA card to the new hard drive. The static dissipation bag preferably has an opening whereby the PCMCIA connector can be extended through to connect to the PCMCIA port of a computer.

The new hard drive and connected hard drive connector assembly can be manipulated within the static dissipation bag to extend the PCMCIA connector in and out of the opening of the static dissipation bag. The PCMCIA connector is connected to the PCMCIA or equivalent port of the computer to effect the data transfer from the existing hard drive to the new hard drive. The PCMCIA connector is disconnected from the PCMCIA or equivalent port after the data transfer from the existing hard drive.

For a backup option, the PCMCIA connector of the hard drive connector assembly is connected to the PCMCIA or equivalent port of a computer, the data of at least one of the hard drives in the computer is transferred to the existing hard drive while the existing hard drive is packaged in the static dissipation bag and the PCMCIA connector is disconnected from the PCMCIA or equivalent port after the data transfer is complete. The static dissipation bag is grounded to the computer and operator prior to connecting the PCMCIA connector to the computer.

In another backup embodiment, a hard drive with a connected hard drive connector assembly having a PCMCIA connector is packaged in a static dissipation bag having a conductive coating on its exterior surface; the packaged hard drive is mounted on an elevated table, the PCMCIA connector is extended out of the bag, the PCMCIA connector of the hard drive connector assembly is connected to the PCMCIA or equivalent port of a computer, the data from the computer is transferred to the hard drive while the hard drive is packaged in the static dissipation bag and the bag is mounted on the elevated table, and the PCMCIA connector is disconnected from the PCMCIA or equivalent port after the data transfer is complete. Preferably, the static dissipation bag is grounded to the computer and the operator prior to connecting the PCMCIA connector to the PCMCIA or equivalent port. The PCMCIA connector of the hard drive connector assembly can be extended out of an opening in the static dissipation bag when connected to the PCMCIA or equivalent port. The height of the PCMCIA connector above a support surface, i.e., table top, is approximately the height of the PCMCIA or equivalent port when the computer is on the support surface, i.e., table top, because the hard drive and hard drive connector assembly are mounted on an elevated table to provide such height.

For a static dissipation bag having a wing or field of polymeric film, the envelope and the two fields of polymeric film can be contiguous, or the envelope and the two fields of polymeric film can be separate components conductively connected to one another.

Preferably each separate conductive lead of the static dissipation bag has attachment means connected to the free end of the conductive lead.

BRIEF DESCRIPTION OF THE DRAWINGS

FIG. 4 is a top front perspective view of the shipping box of FIG. 2 containing a hard drive within a static dissipation bag;

FIG. 5 is a cross-sectional view taken along lines 5—5 of FIG. 4;

FIG. 6 is a top front perspective view of a shipping box of the present invention with a top sponge layer, a connector cable and conductive leads;

FIG. 7 is a cross-sectional view taken along lines 7—7 of FIG. 6;

FIG. 8 is a partial top view of another embodiment of the present invention depicting a static dissipation bag of the present invention housing a hard drive, conductive leads and a connector cable in a transportation box;

FIG. 9 is a top front perspective view of the static dissipation bag shown in FIG. 8;

FIG. 9A is a top front perspective view of a static dissipation bag of the present invention;

FIG. 10 is a top perspective view of an opened empty bag of FIG. 9;

FIG. 11 is a top perspective view of the static dissipation bag of FIG. 10 fully opened;

FIG. 14 is a cross-sectional view of a data transfer system of the present invention;

FIG. 15 is a partial cross-sectional view of the attachment of a conductive lead to a static dissipation bag;

FIG. 16 is a partial cross-sectional view of the attachment of a conductive lead to a static dissipation bag;

FIG. 17 is a partial cross-sectional view of the attachment of a conductive lead to a static dissipation bag;

FIG. 18 is a top view of another embodiment of a static dissipation bag of the present invention;

FIG. 19 is a cross-sectional view taken along line 19—19 of FIG. 18;

FIG. 27 is a top view of another embodiment of the static dissipation bag of the present invention;

FIG. 28 is a top view of a further embodiment of the static dissipation bag of the present invention;

DETAILED DESCRIPTION OF THE INVENTION

Figure 1:
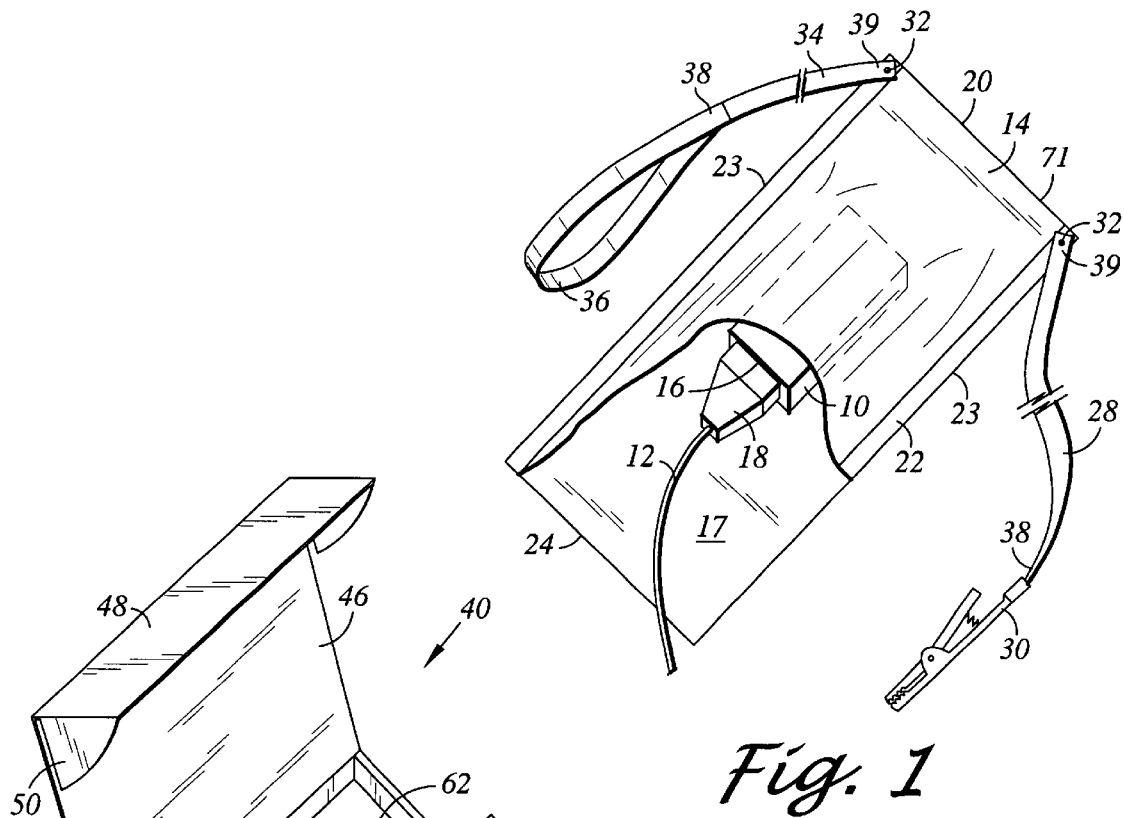
FIG. 1 is a partial cutaway top view of a static dissipation bag of the present invention with a hard drive.

Referring to FIG. 1, the hard drive 10 with the connector cable 12 and connector cable plug 18 attached is stored in static dissipation bag 14. The bag 14 is conveniently made by taking a length of static dissipation material, normally Mylar brand polymeric film with a vapor deposit or ion deposit of a conductive material, such as metal, on the outer side. Optionally, the bag can have a conductive coating on the inner surface or on both the outer and inner surfaces. The length of static dissipation material is folded at what is to become rear edge 20 back on itself, and the sides 23 are sealed by sealed joints or unions 22, to yield a bag or envelope with an open front end 24, a closed rear edge 20, sealed sides 23, and a central cavity 11 in communication with the open end 24. Most hard drives are not shipped with the connector cable 12 attached. However, attachment of the connector cable to the hard drive is preferred for this invention. The hard drive and attached connector cable are inserted into the bag. The bag open front end 24 can be collapsed or squeezed around the connector cable (see FIG. 8) or folded over (see FIG. 13) and optionally taped to the body of the bag.

In the embodiment shown in FIG. 1, a computer conductive lead 28, having an alligator clip 30 at its free end 38 and conductively secured at the other or secured end 39 to the bag 14 by rivet 32, is used to dissipate static voltage differentials between the computer and the bag. The operator conductive lead 34 is used to equalize or dissipate any static voltage differential between the technician or operator installing or removing a hard drive on or from a computer, and the computer on which the hard drive is to be installed and/or removed. Conductive lead 34 has a loop 36 at the free end 38, conveniently created by having the free end 38 of the conductive strip 34 coated with a conductive adhesive (not shown) to secure the free end to the conductive lead to form the loop 36. The loop can be placed on the operator's or technician's wrist. The other end 39 of the operator conductive lead 34 is conductively attached to the bag 14 by rivet 32. The loop 36 can also be formed by riveting the free end 38 to the conductive lead. The attachment ends 39 of the conductive leads 28 and 34 can be conductively attached to the bag by known means, such as by being heat-welded to the bag, secured with conductive adhesive or glue, or attached to the bag by mechanical attachments, such as an alligator clip, a press clip, spring clip, staple or form an integral part of the bag as described below.

Figure 2:
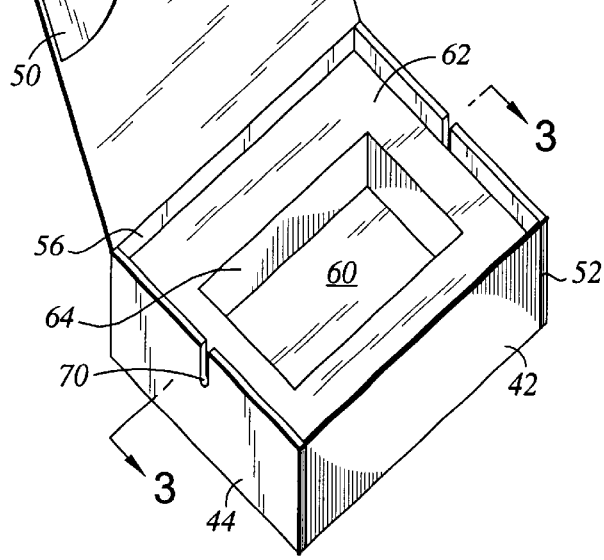
FIG. 2 is a top front perspective view of a transportation box of the present invention.
Figure 3:
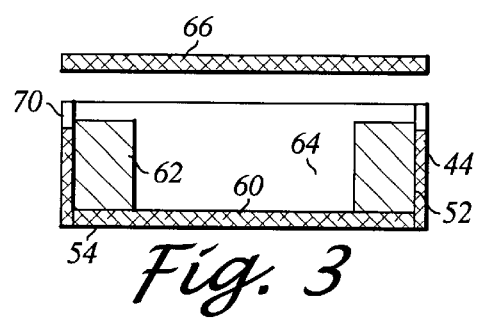
FIG. 3 is a cross-sectional view taken along lines 3—3 of FIG. 2.

Referring to FIGS. 2 and 3, a hard drive 10 within a static dissipation bag 14 (not shown) is packaged in shipping container or box 40, normally made of cardboard or corrugated cardboard, which has a front wall 42, side walls 44, a hinged top wall 46, with a hinge front flap 48, and wings 50. When the top wall is rotated downward onto the top of the shipping box 40, the front flap 48 covers the front wall 42 and the wings 50 can be inserted into slots 52 at both ends of the front wall 42 to lock the front wall 42 and top wall 48 in place. Each of the side walls 44 has a cable slot 70 for receiving connector cable 12 of the hard drive for the purposes described herein. Optionally, the box 40 can have a cable slot in one or more walls or multiple slots in one or more walls, such as in the side wall, front, and/or back walls. The cable slot or slots can be in the front wall, the back wall, or the like. The shipping box can also be a conventional box having a separate open-top bottom container, and an open-bottom top container (like a candy box) or a slide box (like a match box) having an inner container which slides into an outer cover.

The shipping container 40 contains shock absorbent material, conveniently polymeric sponge foam material. Optionally, static dissipating polymeric sponge can be used. The box can contain a sponge bottom layer 60, a sponge intermediate layer 62 having a cavity 64 for receiving the hard drive within the static dissipation bag. During shipment, the cavity 64 is sealed or covered with a sponge top layer 66 (FIG. 3). The top, bottom and/or intermediate layers can be one piece or formed of several pieces of foam.

Referring to FIGS. 4 and 5, the shipping container or box 40 has a cavity 64 containing a static dissipation bag 14, housing a hard drive 10. The connector cable 12 is secured to the hard drive with connector 18. The cable is fed through cable slot 70 in the side wall 44 of the shipping container or box 40.

The static dissipation bag 14 is, preferably, at least twice as large, i.e. at least twice as long and twice as wide, as the hard drive 10. In order to free the connector cable 12 from interference by the bag, the hard drive and connector cable 12 can be moved to the open front end 24 of the bag. The excess length of bag material 72 is conveniently folded under, as shown in FIG. 5, so that the hard drive and static dissipation bag can reside in the cavity 64 of the transportation box during the data transfer, as described herein. The excess width of the bag 74 can be folded upwardly, as illustrated in FIG. 4, or folded over as shown in FIGS. 8 and 9. Optionally, the bag can be sealed around the connector cable after attachment of the connector cable to the new hard drive, as shown in FIG. 8.

Referring to FIGS. 6 and 7, FIG. 6 illustrates an alternative embodiment of the shipping container 40A. The hinged top wall 46A with side wings 50A and front flap 46A closes down onto the top of the box with the front flap 46A encompassing the front wall 42 and the wings 50A encompassing the side walls 44.

FIG. 7 shows the shipping container 40 with a static dissipation bag 14 enclosing or containing a hard drive 10 connected to cable 12 via connector 18. The static dissipation bag with hard drive is sandwiched between the sponge bottom layer 60, the sponge intermediate layer 62, and the sponge top layer 66. The connector cable 12 is passed around one edge 67 of the sponge top layer 66 and the bulk of the connector cable 12 with the plug enclosed in the small dissipation bag 14A is coiled and stored on the top of sponge top layer 66. The conductive leads, which are permanently attached to the static dissipation bag 14, as will be described below, are stored also on the top of sponge top layer 66. In this embodiment, the hard drive and the static dissipation bag 14 do not have to be touched by an operator until after the data transfer is complete, as described below.

To initiate the operation of installing a new hard drive, the box is opened and the connector cable 12 is uncoiled from the top of the top sponge layer 66. The small static dissipation bag 14A is removed from the plug end of the connector cable, and the connector cable is attached to the computer as described above. The data transfer then commences. It is not necessary at this stage to ground the operator with the static dissipation bag or the computer since the hard drive is not being removed from the static dissipation bag which is grounded to the computer. However, once the computer chassis is opened, and the old hard drive is to be removed or the new hard drive is to be added, leaving the old hard drive in the computer, it is desirable to have the operator grounded with respect to the static dissipation bag and particularly the computer. The conductive lead 28 is connected to the computer as described above, preferably before the new hard drive is removed from the static dissipation bag and the old hard drive is removed from the computer. The technician or operator puts a hand through the loop 36 in the operator conductive lead 34 to complete a ground between the operator, the static dissipation bag, and the computer. The sponge top layer 66 is then removed from the box, and the static dissipation bag with the hard drive therein is removed from the cavity 64. The bag is opened if closed or sealed. The hard drive 10 is removed from the static dissipation bag 14, the static dissipation bag is opened up or unfolded, as described above (see FIGS. 9–11), and the hard drive is placed on the static dissipation bag. The new hard drive with transferred data can then be installed directly into the computer, or the old hard drive can be first removed if it is to be replaced. After removal from the computer, the old hard drive is placed on the static dissipation surface, and the new hard drive is placed in the computer. The computer is then closed up and started up. During the start-up operation, the old hard drive is then placed into the static dissipation bag, the static dissipation bag is closed and folded up, and the bag and the hard drive are placed into cavity 11 of the shipping container 40A. Optionally, the connector cable 12 can be attached to the old hard drive and the free end of the computer cable with the computer plug can be coiled and stored on top of the sponge top layer 66. Likewise, the free ends of the conductive leads 28 and 34 can be coiled and stored on top of the top sponge layer. The box can then be closed.

During the data transfer, the box can be closed since the slit 51 in the side flap 50A of the box which coincides with the slot 70 to permit free passage of the connector cable 12 through the flap 50A and the side wall 44 of the shipping container 40A.

Referring to FIG. 8, in one embodiment of the present invention, the hard drive (not shown) is connected to the cable connector 12 and enclosed in the static dissipation bag 14. The front end 24 of the bag is sealed or closed around the connector cable 12 by collapsing the bag front end and squeezing and compressing it around the cable and securing it with tape 76, preferably static dissipating tape, or the like. The free end or other end of the connector cable 12 has a PCMCIA card and a plug or connector 15 for connecting the cable to a computer PCMCIA or equivalent port. The card and connector 15 and a short length of the cable are preferably packaged or sealed in a small static dissipation bag 14A (shown in phantom) with the bag being collapsed around the cable and optionally secured or bound with tape, preferably antistatic tape, during shipment and warehousing. The two static dissipation bags ensure the dissipation of static charge from the hard drive and connector cable 12 to prevent electrostatic discharge damage to the components during the connection and setup, as described herein. The hard drive connector cable 12 and the static dissipation bag 14 are placed in cavity 64 formed by the bottom sponge layer 60 and the intermediate sponge layer 62. On one side of storage container 40, the back side in this case, the computer conductive lead 28A and the operator conductive lead 34A are positioned on top of sponge intermediate layer 62 for ease in shipment and transportation. The computer conductive lead 28A has alligator clips 30 attached at each end 38 and 39 of the lead. The operator conductive lead 34A has alligator clip 30 located at securing end 38 and a loop (not shown) at the free end 39. The leads are folded over to compact them (not shown). The leads can be from two to four feet in length, or shorter or longer in length and can be stored in the shipping container 40. The leads can be made of conductive polymeric material, conductive solid wire, conductive braided wire, or the like. The alligator clips at the ends of the computer conductive lead 28A can be attached to the static dissipation bag and to the computer with the alligator clips. The operator conductive lead 34A can be attached to the bag by its alligator clip 30 and the other end, the looped end, of the operator conductive lead is secured over or fitted over the wrist of the operator.

The static dissipation bag 14 shown in FIG. 8 is quite large, both in its length dimension and width dimension. In order to fit the cavity, the excess side material 74 of the bag is folded over the top of the bag and the excess length 72 of the bag is then folded under the bag. The excess bag length can also be folded over the bag (not shown).

Figure 13:
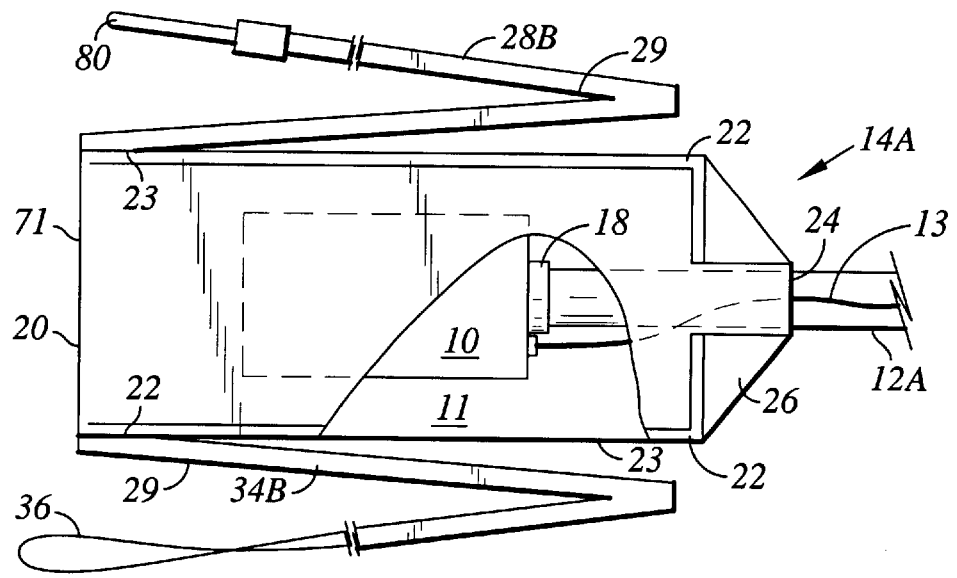
FIG. 13 is a partial cutaway top view of an embodiment of the static dissipation bag of the present invention.

FIG. 9 shows another embodiment 14 of the bag illustrated in FIG. 8. In FIG. 9, the excess length 72 of the bag is folded under the bag rather than over the bag. The excess bag sides material 74 of the bag is folded along folds 70 over so that the sides 23 of the bag meet along the longitudinal center line (not shown) of the bag, and then the excess length 72 of the bag is folded under along fold 72. The bag contains a hard drive (not shown) and connector cable 12. The front end of the bag is compressed around the cable and crimped with tape 58 to dissipate static charge and prevent electrostatic discharge damage to the hard drive and/or the computer during the operation. Alternatively, the front end can be folded around the cable as shown in FIGS. 9A and 13.

FIG. 9A illustrates static dissipation bag 14 shown in FIGS. 8 and 9. In FIG. 9A, the corners 25 of the open end 24 are folded back on folds 72A onto the top of the bag to form triangular folded-over sections 26 to close off the front opening 24 just leaving sufficient space for the cable connector 12 to exit the bag. Optionally, the triangular folded-over sections 26 may be taped to the bag to maintain the closure.

In FIG. 10, the tape 58 has been removed from the front end 24 of the bag, and the hard drive has been removed, leaving an empty bag with an open front end 24. In FIG. 11, the excess bag length 72 has been folded out from underneath the bag, and the excess bag sides 74 have been folded out to give a large static dissipating surface 27, which can be used as a work surface during the installation process of the hard drive, as described herein.

In the preferred embodiment of the present invention, the new hard drive 10, together with its connector cable 12 and connector 18, is assembled as a unit and encased in the static dissipation bag 14, as illustrated in FIG. 7. The hard drive cable connector 12 and the bag are placed in shipment box 40 and sandwiched between the bottom sponge layer 60, intermediate sponge layer 62, and the top sponge layer 66 (not shown). The free end of the connector cable is conveniently stored on top of the foam top layer (see FIGS. 6 and 8). However, the hard drive and connector cable can be shipped unconnected and connected before the data transfer step.

When the operator receives the new hard drive with the connector cable attached in the static dissipation bag and the shipping box, the operator will open the box, unwind the free end of the connector cable 12 stored in the box. The connector cable 12 has a plug at its free end, i.e., second end, which is adapted to fit a PCMCIA or equivalent port. The connector cable is connected to the PCMCIA or equivalent port (sometimes called the PC card port) or the newer Card bus or equivalent port of the computer. The static dissipation bag is not opened at this stage. Optionally, prior to making this connection, the operator or technician will connect the conductive computer lead 28 from the bag to the computer and connect the operator conductive lead 34 from the bag to the operator's wrist to prevent any potential electrostatic discharge, which can cause damage to either the hard drive and/or the computer. After the connection is made between the computer port and the connector cable 12, the operator starts the computer and makes the data transfer from the existing hard drive of the computer onto the new hard drive. In some instances, the hard drive manufacturer will supply data transfer software on a 3½ inch floppy disk, CD ROM, or the like, containing a program specifically designed for data transfer and data verification for the new hard drive.

After the data transfer has taken place, which can occur in a matter of minutes or over an hour depending upon the size and amount of data being transferred and the speed of the existing hard drive in the computer, the operator turns off the computer and opens the computer chassis to switch hard drives. Either immediately before opening the computer chassis or immediately after opening the computer chassis, it is essential, in order to prevent static discharge, to connect the conductive leads from the static dissipation bag to the computer and the operator, using the computer conductive lead 28 and to connect the bag to the operator, using the operator conductive lead 34, as described above. Naturally, if this step has already been carried out, this step is not required or repeated at this juncture. The operator then opens the static dissipation bag to remove the hard drive with the connected connector cable. The bag is purposely made much larger than required to house the hard drive and connector cable plug 18. The bag is unfolded and laid out, as shown in FIGS. 9 through 11, to give a static dissipating work surface 27 to the operator. The conductive leads make the connections between the operator, the bag and the computer. Although not shown in FIGS. 9 through 11, the bag will be connected to the operator and to the computer with conductive leads, as described above.

The plug 18 of connector cable 12 is disconnected from the new hard drive, and the new hard drive is placed on the static dissipating work surface 27 by the operator who is connected to the bag 14 by conductive lead 34. The operator, who is connected to the computer via conductive leads 28 and 34 and bag 14, can then remove the existing hard drive from the computer. In some instances, the computer will have room for more than one hard drive, and the operator may decide to keep the existing hard drive in the computer and add the new hard drive. However, if the old hard drive is to be replaced and removed from the computer, it is placed on the static dissipating work surface 27 to protect it after removal from the computer. The new hard drive is removed from the static dissipating work surface 27, with the operator still being grounded through the operator conductive lead 34 to the bag 14, and the bag being grounded through computer conductive lead 28 to the computer. The new hard drive is installed in the computer, the computer chassis is closed, and then re-started.

Normally, no other operations have to be carried out to make a successful data transfer, installation of the new hard drive, and operation of the computer with the new hard drive containing the transferred data. The old hard drive is placed in the static dissipation bag with or without connector cable 12 attached by plug 18. If the old hard drive is to be stored or shipped, or the like, without the connector cable, the bag is sealed easily by folding it over and placing it in the shipment box 40.

However, the old hard drive with the connector cable, the static dissipation bag, together with the shipping box, can be utilized as a back-up device. The plug 18 is connected into the hard drive cable socket (not shown) of the old hard drive and the connected end of the connector cable 12 are inserted into the static dissipation bag. The open end of the bag is sealed, closed with tape or folded over in a manner similar to that shown in FIG. 9 or FIG. 13. The combination of the bag, old hard drive, and connector cable 12 is placed in the transportation container or box 40. When the old hard drive is not in use, the free end of the connector cable can be folded up, as shown in FIGS. 6 and 8, and the conductive leads 28 and 34 can be stored in the box, as shown in FIGS. 6 and 8.

When the operator desires to use the old hard drive as a back-up drive, the operator opens the box, unwinds the connector cable 12, and connects it to the computer via the PCMCIA port or card bus or equivalent port. Optionally, prior to making the connection to prevent static discharge damage to the old hard drive, the data it contains, and/or to the computer or its components, the computer conductive lead 28 can be attached between the bag and the computer, and the operator conductive lead 34 can be attached to the operator and to the bag that dissipates static discharge. The old hard drive is maintained in a sealed condition or enclosed within the static dissipation bag and the operator operates the computer to make the necessary data transfer to the old hard drive which functions as a back-up. After the necessary data for back-up has been transferred, the operator can turn off the computer, disconnect the connector cable 12 from the PCMCIA or card bus and fold up and store the free end of the connector cable in the transportation box 40, as shown in FIGS. 6 and 8. Then, if the conductive leads 34 and 28 are attached or connected, they are then disconnected from the computer and the operator, folded up and stored in the transportation box, as shown in FIGS. 6 and 8.

The hard drive in the static dissipation bag is kept or stored in the cavity 64 surrounded by the shock-absorbing sponge material of the bottom layer 60 and the intermediate layer 62 and, optionally, the top layer 66. By maintaining the hard drive in this shock-absorbing media, i.e., the sponge material, damage from jolts, shock, and other movements are minimized to the hard drive which in turn minimizes data transfer errors, which can be caused by the movement of the recording head during the data transfer step.

Figure 12:
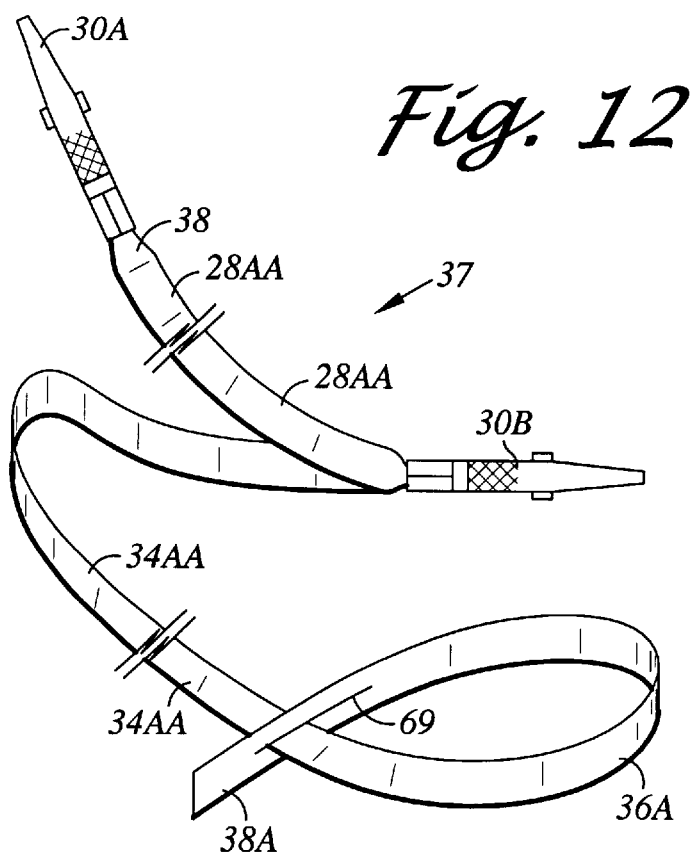
FIG. 12 is a perspective view of another embodiment of the conductive attachment lead of the present invention.

In another embodiment of the present invention shown in FIG. 12, a single conductive lead is used to connect the bag, the computer and operator. The unitary conductive lead 37 has two alligator clips, 30A at the free end 38 and 30B spaced apart therefrom, such as about 1½–2 feet or more away from alligator clip 30A, in the middle of the conductive lead. The other end 39A of the conductive lead 37 has a slit 69 which is adapted to have the length of the conductive lead fed through the slit 69 to form a loop 36A which can be placed over the wrist of an operator. The conductive lead 37 has a first end portion 28AA which will connect the computer through the bag to a second end portion 34AA which will connect the bag to the operator's wrist. The conductive lead is one piece, but approximately midway, the conductive lead is bent back on itself and connected to the alligator clip 30B which will be attached to the bag.

In another embodiment of the present invention, described with respect to FIGS. 18 and 19, alligator clip 30B can be eliminated and the conductive lead 37 can be attached to the bag with conductive adhesive, a rivet, or staple, or can be spot-welded to the bag (see FIGS. 18 and 19).

Referring to FIG. 13, another embodiment of the static dissipation bag 14A of the present invention is illustrated. The bag 14A is similar to the bags described above with respect to FIGS. 1 through 11, with the exception that static dissipation bag 14A has integral conductive leads 28B and 34B. The bag is produced from a sheet of polymeric film, such as Mylar brand film, which is coated on at least one side with metallic or other conductive material layers, such as by vapor deposition or plasma deposition or ion deposition. When the static dissipation bag s of the present invention are to be used as static dissipating work surfaces, the exterior surface of the bag at least will have a conductive coating. In the embodiment shown, the bag and the conductive lead are produced from a single sheet of polymeric film which is folded over, the rear edge 20 representing the fold 71. Seams 22 are formed by heat-welding the overlapping layers of polymeric material together or by gluing the overlapping polymeric material together with the appropriate adhesive to form a central chamber 11 to receive a hard drive 10 or other device, leaving a front opening 24 for inserting and removing the hard drive or other device. Extending outwardly from the sides 23 of the static dissipation bag 14A are wings of the excess polymeric material. The overlapping polymeric material of the wings is welded together or glued together with an appropriate adhesive. The wings are cut or perforated with tear lines 29 to form conductive leads 288 and 34B as will be described in greater detail with respect to FIG. 18. The conductive leads are fitted with devices for attaching the leads to the computer and to the operator. In this case, the free end of the conductive lead 28B has a male jack 80 to connect to a grounding port on the chassis of the computer and conductive lead 34B has a loop 36 to fit on the operator's wrist. The connector cable 2A to the hard drive is a ribbon connector. The connector cable 12A extends beyond the front open end 24 of the static dissipation bag 14B. In this embodiment, the hard drive has an external power requirement, which is met by power lead 13, which extends with the connector cable 12A out the front open end 24 of the bag. The two corners 25 of the bag are folded over to close off the open front end 24 except where the connector cable 12A and the power line 13 exit the bag, similar to the bag of FIG. 9A. If desired, the folded-over section 26 can be taped down with an adhesive tape.

Referring to FIG. 14, in some situations, it may be advantageous to make the data transfer outside the computer. In the system shown in FIG. 14, the power requirement for the old hard drive 10 and the new hard drive 10A is met with power line 13A which supplies power to both hard drives from computer 82. New hard drive 10A is connected to the computer through connector cable 12 and T-connector 18A which has a gender-changing plug. The old hard drive is connected to the new hard drive from there to the computer by connector cable 12A and T-connector 18A. The computer operating software controls the data transfer from the old hard drive 10 to the new hard drive 10A and supplies the power for powering up the two hard drives. To protect the hard drives and the data stored therein from static discharge, both hard drives are contained within separate static dissipation bags 14 and transportation boxes (not shown). Preferably, the T-connector 18A is also enclosed within the bag 14. The bags are grounded to the computer by conductive leads 28 and grounded to the operator through conductive lead 34 in a manner similar to that described above.

The leads 28 and 34 can either be an integral part of the static dissipation bag material, i.e., the polymeric film with a conductive coating, or the leads can be of other material, including conductive polymeric film and/or conductive metal leads which are conductively secured to the static dissipation bag, conveniently at the edge of the bag at a seam line 22.

In FIG. 15, the operator conductive lead 34 is conductively secured to the edge of static dissipation bag 14 with a spring U-clip or compressed U-clip 31. In FIG. 16, computer conductive lead 28 is secured by a spring U-clip or compressed U-clip 31A. The conductive lead is crimped to the U-clip at the union 31AA at the end of arm 31B of the clip. In FIG. 17, the conductive lead 28 is secured in the seam 22 at the edge 23 of the static dissipation bag 14 by thermal welding or with a conductive adhesive. Alternatively, the conductive lead 28 can be riveted into the seam by a rivet 32, shown in phantom in FIG. 17. The static dissipation bags 14 of FIGS. 15 and 16 have at least an exterior conductive coating and the bag 14 of FIG. 17 has at least an interior conductive coating.

In FIG. 18, another embodiment of the static dissipation bag 14B of the present invention is illustrated. The bag envelope 84 has side edges 23 sealed by seams 22, an open end 24, a sealed back end created by the fold 71 of a single piece of polymeric material 78 similar to the envelope 84 of static dissipation bag 14 described with respect to FIG. 1. A single conductive lead 37A is secured to the surface of the envelope 84 (see FIG. 19) by heat-welding or with an adhesive, or optionally rivets, staples, or the like. One free end 38A of the conductive lead 86 forms the computer conductive lead 28 having a spring clip or press clip 31 for attachment to a computer chassis. A spring clip is normally closed, and a press clip is normally open and is pressed to close the two sides of the U-shaped clip. The other free end 38B of the conductive lead 86 forms the operator conductive lead 34, having a loop 36 at its free end 38B, which is formed by having the free end 38B loop back onto the conductive lead 34 to form the loop 36. The free end 38B is secured to the conductive lead 34 by adhesive 33. The loop can also be formed by having the free ends 38 attached to the conductive lead by heat-welding, riveting, or with a clip.

Figure 20:
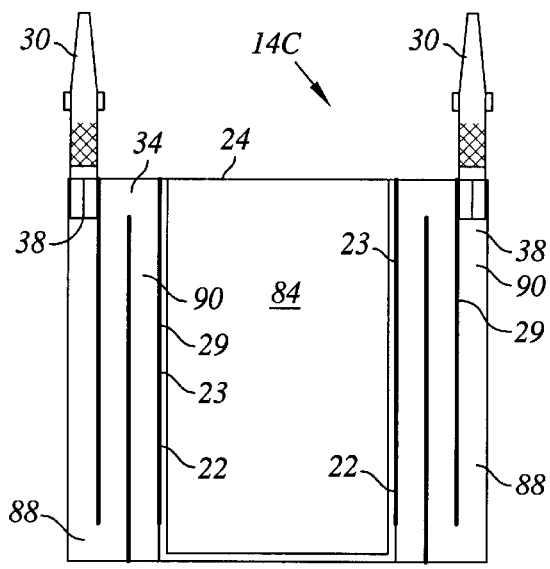
FIG. 20 is a top view of another embodiment of the static dissipation bag of the present invention.

Referring to FIG. 20, another embodiment of the static dissipation bag 14C of the present invention has an envelope 84 and integral conductive leads 88 on each side. The static dissipation bag is made of two sheets of polymeric film having a conductive coating on its outer side. The two sheets are superimposed one on top of the other and sealed together along seams 22 on the sides 23 and at the rear edge 20, to form the bag envelope 84 having a central chamber (not shown) communicating with the open end 24. Two wings 90 extend outwardly from the sides 23 of the envelope. The two wings comprise two plies of the polymeric material which are preferably secured together with heat-welding or a conductive adhesive. The two wings 90 are perforated, scored, or partially cut with tear lines 29 When the wings are torn along tear lines 29, integral conductive leads 88 are formed (see FIG. 13). Other than being on opposite sides of the envelope 84, the two conductive leads are identical and either can be computer conductive lead and the other can be the operator conductive lead. In the embodiment shown, the free end 38 of each conductive lead has an alligator clip 30 attached to the end thereof which is crimped onto the free end 38.

The static dissipation bag 14C can hold the hard drive or other electronic device in the same manner as the other static dissipation bags described herein. The two wings 90 are conveniently folded over or under the top or bottom surface of the envelope 84 and placed into the cavity 64 of the transportation container 40. When the new hard drive or other electronic device is to be installed, each of the conductive leads 88 is pulled by its free end 38 to tear the tear lines 29 to form the conductive leads 28 and 34 which are an integral part of the envelope 84. Preferably, the tear lines 29 are torn free when the bag is placed in the transportation box to permit the open end 24 to be closed off without hindrance from the integral conductive leads 88.

Figure 20A:
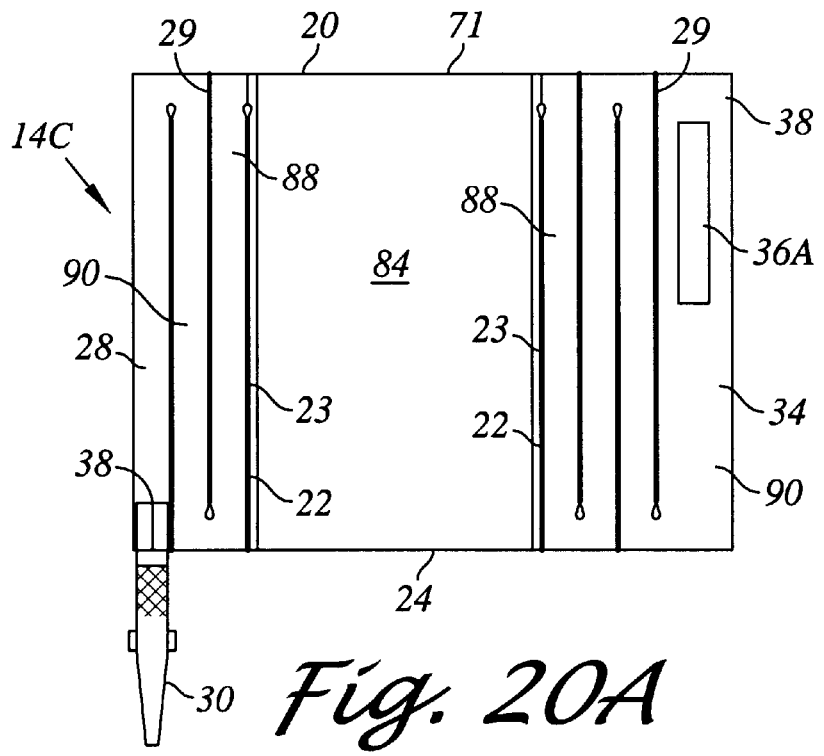
FIG. 20A is a top view of another embodiment of the static dissipation bag of the present invention.

Referring to FIG. 20A, another embodiment of the static dissipation bag 14C' of the present invention has an envelope 84 and integral conductive leads 88 on each side. Static dissipation bags 14C and 14C' have some similarities. The static dissipation bag 14C' is made of one sheet of polymeric film having a conductive coating on its outer side. The sheet is folded with back edge 20 so that the folded two sides are superimposed one on top of the other and sealed together along seams 22 on the sides 23, to form the bag envelope 84 having a central chamber (not shown) communicating with the open end 24. Two wings 90 extend outwardly from the sides 23 of the envelope. The two wings comprise two plies of the polymeric material which are preferably secured together with heat-welding or a conductive adhesive. The two wings 90 are perforated, scored, or partially cut with tear lines 29 and 29' form integral conductive leads 88. When the wings are torn along tear lines 29 and 29', integral conductive leads 88 are formed (see FIG. 13). The integral conductive lead having an alligator clip 30 secured on its free end 38 is the computer conductive lead 28, and the integral conductive lead 88 with a loop 36A at its free end 38 is the operator conductive lead 34. The operator passes his or her hand through the wide slit 69A to be grounded to the bag 14C and the computer. The slot is relatively large (5" to 6" by ¼" to ½") in order to easily receive the hand.

The static dissipation bags 14C and 14C' can also be prepared from two separate sheets of polymeric film having a conductive coating on its outer side. The two sheets are superimposed one on top of the other and sealed together along seams 22 on the sides 23 to form the envelope 84 having a central chamber communicating with the open end. The two wings 90 would extend outwardly from the sides of the envelope and would be secured together with heat welding or conductive adhesive or the like. In virtually all other respects, a bag prepared from a single sheet of polymeric film or a bag prepared from two sheets, after the sides and the ends have been sealed, would be virtually identical in function.

The static dissipation bags 14C and 14C' are used in the same manner as the other static dissipation bags described herein. Preferably, the tear lines 29' next to the sides 23 of the envelope 84 are torn before the bag is inserted into the transportation box so that the open end can be closed off (see FIGS. 9, 9A, and 13). The two wings 90 are conveniently folded over or under the top or bottom surface of the envelope 84 and placed into the cavity 64 of the transportation container 40. When the new hard drive or other electronic device is to be installed, each of the conductive leads 88 is pulled by its free end 38 to tear the tear lines 29 to form the conductive leads 28 and 34 which are an integral part of the envelope 84.

Figure 21:
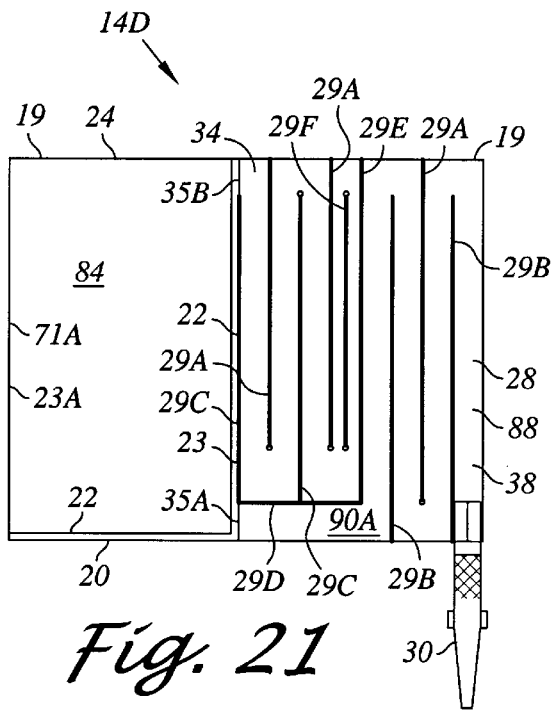
FIG. 21 is a top view of a further embodiment of the static dissipation bag of the present invention.

Referring to FIG. 21, another embodiment of the static dissipation bag 14D of the present invention is illustrated. The embodiment shown is made from a single piece of polymeric film having at least one conductive surface. The polymeric material is folded over at fold 71A on side 23A to form a sandwich. The envelope 84 is formed by sealing side 23 of the envelope along seam line 22 and the bottom edge 20 of the envelope sealed along seam line 22 by heat-sealing or sealing with an adhesive material. The top edge 19 of the envelope 84 is left open to form the open front 24. A series of parallel tear lines 29 are cut, perforated, or scored in the wing 90A which extends beyond side 23 of the envelope 84. Tear lines 29A extend from top edge 19 towards the bottom edge 20 but do not reach bottom edge 20. Tear lines 29B extend from the bottom edge 20 towards the top edge 19 but do not reach the top edge. Tear lines 29C extend from tear line 29D towards the top edge 19 but do not reach top edge 19. Tear line 29E extends from horizontal tear line 29D to the top edge 19, and tear line 29F is positioned between tear line 29A and 29E. An alligator clip 30 is attached to the free end 38 of the portion of the wing that constitutes the computer conductive lead 28; the free end 38 of the portion of the wing that constitutes the operator conductive lead 34 has a slit formed by tear line 29F which can be used to form a loop that can be attached to the operator. The loop is similar to loop 36A shown in FIG. 12. In other words, when the wing has been torn along the tear lines, the envelope 84 and the computer conductive lead 28 are passed through the slit formed along tear line 29F to form a loop similar to the one shown in FIG. 12.

The operator conductive lead 34 is joined to the envelope 84 at bridge 35B, and similarly, the computer conductive lead 28 is joined to the envelope 84 at bridge 35A. The bridges which cross the seam line 22 exist because the wing 90A and the envelope 84 are formed from the integral piece of polymeric membrane and are not separated by a tear line 29C.

The static dissipation bag 14D is utilized in the same manner as the other static dissipation bags of the present invention. The envelope has an open top 24 which extends into a central cavity (not shown) which can receive a hard drive or other electronic device. The scored wing 90A can be folded over or under the envelope 84 to place the envelope with the hard drive or electronic device into the cavity 64 of the transportation container 40 as described above. When the time arrives for the installation of the hard drive or electronic device into the computer or other electronic piece of equipment, the free end 38 of the computer conductive lead 28 is pulled away from the wing 90A to tear along the tear lines 29F to form the conductive lead 28. Then, the free end 38 of the operator conductive lead 34 is pulled to complete the tears along the tear lines 29 to form the operator conductive lead 34. The computer conductive lead 28 remains attached to the envelope 84 via bridge 35A, and the operator lead 34 remains attached to the envelope via bridge 35B.

Figure 22:
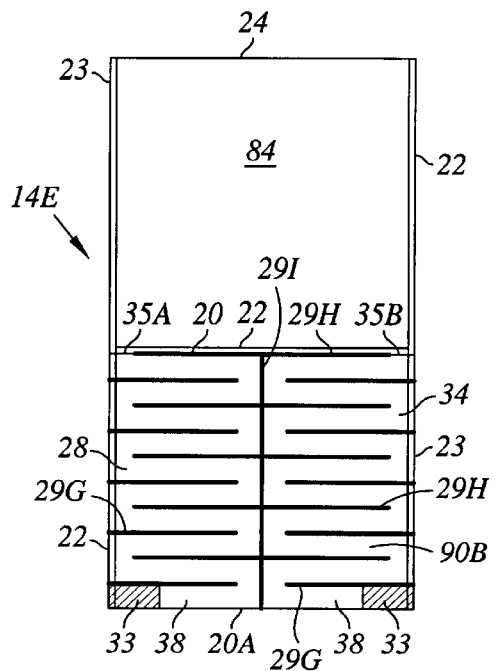
FIG. 22 is a top view of another embodiment of the static dissipation bag of the present invention.

Referring to FIG. 22, static dissipation bag 14E has an envelope 84, and an integral wing 90B. The bag can be made from two sheets of polymeric film or from a single sheet of polymeric film folded over on itself at the top edge 19, the bottom edge 20A, or one of the sides 23. The sides 23 of the bag are sealed along seam 22 by heat-welding, adhesive, or gluing. The bottom of the envelope 84 is sealed along seam 22, again with heat-welding, adhesive, or gluing. Preferably, the wing 90B of bag 14E has two sheets of polymeric film secured together with heat-welding, adhesive, or glue, not only in the seam area 22, but also across the entire field of the wing top edge to the bottom edge and from one side edge to the other side edge 23. The field of polymeric film, i.e., wing 90B is cut, perforated, or scored with a series of tear lines 29. Tear lines 29G extend from the sides 23 towards the center of the wing but do not meet. Lines 29H extend from the center of the wing and extend out towards the sides 23 of the wing, but do not reach the sides of the wing. A single cut line or perforated line 29I extends from tear line 29H adjacent the bottom edge of the envelope 84 to the bottom edge 20A of the wing. The series of tear lines form a pattern. When the tear lines 29G, 29H, and 29I are pulled apart, computer conductive lead 28 and operator conductive lead 34 are created. The computer conductive lead 28 is integrally connected with the envelope 84 via bridge 35A and the operator conductive lead 34 is integrally connected with the envelope 84 via bridge 35B. Free ends 38 of the conductive leads are coated with a conductive adhesive 33 to secure the computer conductive lead 28 to the computer chassis and to form a loop (not shown) for the operator conductive lead 34 which can be placed over the wrist of an operator or technician as described above. The envelope 84 of the static dissipation bag 14E has sealed sides 23 and sealed rear edge 20, an open end 24 which is in communication with the central cavity (not shown) of the envelope. The central cavity is adapted to receive and hold a hard drive or other electronic device.

Figure 23:
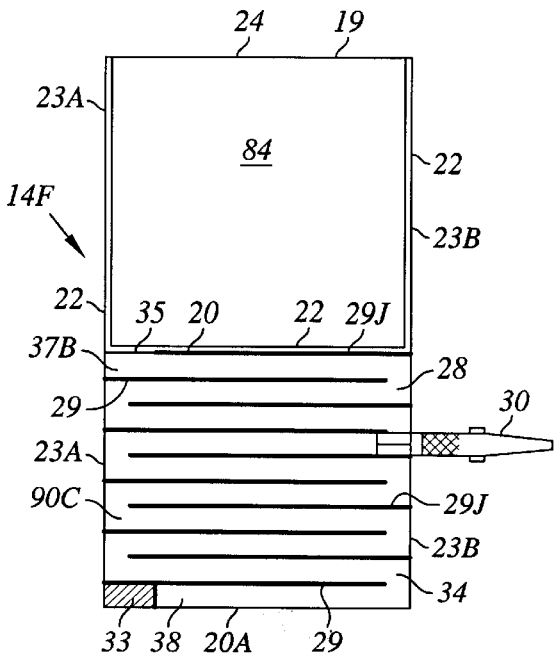
FIG. 23 is another embodiment of the static dissipation bag of the present invention.

Referring to FIG. 23, the static dissipation bag 14F has an envelope 84 and a field of polymeric material, i.e., wing 90C extending from the rear edge 20 of the envelope 84. The sides 23 and the rear edge 20 of the envelope are sealed along seam 22. Seam 22 can be heat-welded or adhesively bonded. The bag 14F can be made from two pieces of polymeric film having a conductive layer on at least one side or of a single sheet of polymeric film folded on a side 23, at the top edge 19 of the envelope, or at the rear edge 20A of the wing 90. If prepared from a single sheet folded at the top edge 19, the top edge has to be cut to form open front 24 which communicates with the central cavity (not shown) of the envelope 84. Alternatively, the wing 90C of the envelope 84 can be prepared from one or more separate sheets of the field of polymeric film having a conductive coating on at least one side. If the envelope and wings are prepared from separate sheets of polymeric film, the polymeric film constituting the wings can be bonded in the seam of the envelope 84 or can be bonded on the top surface and the bottom surface of the envelope as shown in FIGS. 24, 25 and 26, respectively, for static dissipation bags 14DD, 14DDD and 14DDDD.

Figure 24:
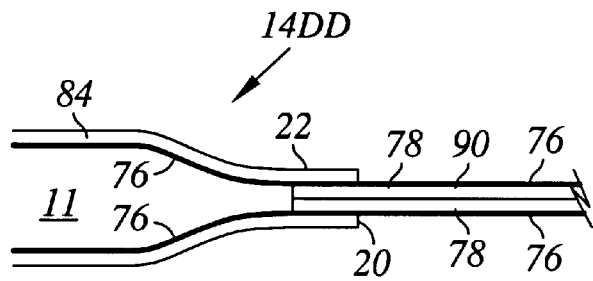
FIG. 24 is a cross-sectional view taken along line 24—24 of FIG. 23.

FIG. 24 shows the wing 90 sandwiched at the rear edge 20 of the envelope 84 in the seam 22. The wing comprises two plies of the polymeric film 78. The two plies of polymeric film can be secured together with heat-welding and/or adhesive bonding. A conductive coating 76 of the envelope is in the interior of the bag and the conductive coating 76 of the wing is on the exterior to ensure face-to-face contact between the conductive coatings of the envelope and wing.

Figure 25:
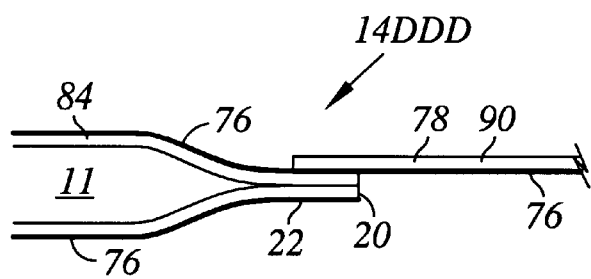
FIG. 25 is an alternative embodiment of the union taken along lines 24—24 of FIG. 23.

Referring to FIG. 25, the wing 90 is secured to the outer surface of the envelope 84 at the seam 22 with adhesive bonding or heat-welding. The wing 90 in this embodiment of the static dissipation bag 14DDD is single-ply polymeric film 78. The conductive coating 76 of the envelope 84 is on the exterior of the bag and the conductive coating 76 of the wing is on the underside. Thus, the conductive coating of the wing and the conductive coating of the envelope are in face-to-face contact to ensure conductive contact between the wing and the envelope Referring to FIG. 26, the wing 90 comprising two plies of polymeric film 78 is secured to the rear edge 20 of the envelope 84 on the exterior sides of the envelope of seam 22 with heat-welding and/or adhesive bonding. The conductive coating 76 of the envelope is on the exterior of the bag 14DDDD, and the conductive coating 76 of the wing is on the interior to ensure face-to-face contact between the conductive coating of the envelope and the wing.

Figure 26:
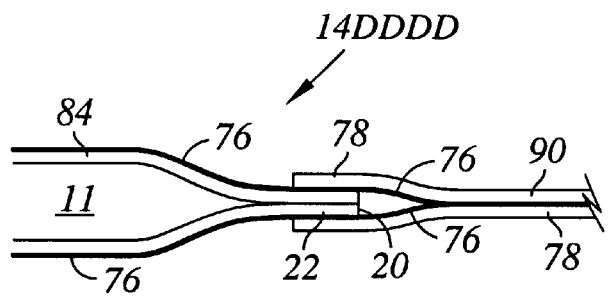
FIG. 26 is a cross-sectional view similar to the cross-sectional view of FIG. 24 showing still another embodiment of the union.

Although the static dissipation bag shown in FIGS. 24 through 26 have been illustrated with a conductive coating on one side of the polymeric film of the envelope and wing, the polymeric film and the envelope and/or wing can have a conductive coating on both sides.

Referring back to FIG. 23, the wing 90C of static dissipation bag 14F has a plurality of tear lines 29 alternatively extending from side 23A towards, but not meeting, side 23B, and a second series of tear lines extending from side 23B towards side 23A, but not reaching side 23A, to form a continuous strip of polymeric film in a zigzag fashion starting at the bridge 35 and extending to the remote free end 38 of integral conductive lead 37B. Preferably, the wing 90C, comprising two or more plies of polymeric material has the plies secured together by adhesive bonding and/or heat-welding. Between the free end 38 of the conductive lead 37B and the bridge 35, an alligator clip or other device for securing the conductive lead to a computer is conductively attached to the conductive lead 37B. The portion of the conductive lead from the bridge 35 to the alligator clip 30 constitutes the computer conductive lead 28 of the bag 14F and the remainder of the conductive lead 37B from the alligator clip 30 to the free end 38 of the conductive lead 37B constitutes the operator conductive lead 34 of the bag 14F. In the embodiment shown, the free end 38 of the conductive lead 37B has an adhesive coating 33 which can be utilized to prepare a loop for the operator conductive lead, as described above.

Preferably, the tear lines 29 are perforations which do not separate and maintain the wing 90C as a single piece until the operator tears the tear lines to form the conductive leads. When the conductive leads are required, the operator pulls the free end 38 away from the wing 90C, causing the perforation or tear line 29 to tear, forming a long zigzag conductive lead 37B having a computer conductive lead portion 28 and an operator conductive lead portion 34.

Preferably, the static dissipation bags of FIGS. 1, 4–11, 13–27, described herein, are made much larger than the hard drive or other electronic device to be stored and transported in the bag. The large bag can be folded as described herein, with the wing[s] 90 being folded over the top or bottom of the envelope. The sides of the envelope, together with wing[s] 90, can be folded over in a similar fashion as shown in FIG. 8, and the bottom of the envelope 84, together with the folded-over portion of the wing[s] 90, can be folded under or over in a similar fashion, as shown in FIG. 8, in order to reduce the size of the bag to fit in the cavity 64 of the transportation box or container 40.

Referring to FIG. 27, the static dissipation bag 14G is similar to the static dissipation bag shown in FIGS. 23, 24, 25, and 26, with the exception that the wing 90 comprises two superimposed polymeric film layers which are not welded, glued or otherwise bonded together. The top ply 78A of the polymeric film of the wing 90 constitutes the operator conductive lead 34 and the bottom ply polymeric film lying underneath the top ply 78A constitute the computer conductive lead 28 which has an alligator clip secured to its free end 38. Free end 38 of the operator conductive lead 34 has an adhesive coating 33 to form a loop at the end of the free end to secure the conductive lead to the wrist of the operator. As illustrated in FIG. 27, the free end 38 of the operator conductive lead 28 has already been partially pulled apart along a tear line (not shown). In all other respects, the static dissipation bag 14G is substantially identical to static dissipation bag 14G of FIG. 23.

Referring to FIG. 28, the wing 90D of static dissipation bag 14H has a plurality of tear lines 29 alternatively extending from side 23B towards, but not meeting, side 23A, and a long sinuous tear line 29K extending initially from side 23B towards side 23A, but not reaching side 23A, and then extending towards side 23B but not reaching side 23B and then turning back towards side 23A but not reaching side 23A etc. to form a continuous strip of polymeric film in a zigzag fashion starting at point 100A On side 23A and ending at point 100B short of side 23B. The strip extends from bridge 35 past point 102 A, to point 102 B, point 102C, point 102D, point 102E, point 102F, point 102G, point 102H, and free end 38A respectively forming the operator conductive lead 34, and from point 102A it extends to point 102I, 102J, 102K, and free end 38B forming the computer conductive lead 38B. The terminal ends of the tear lines 29 and 29K have relief holes 97 to prevent the tear lines from extending beyond the terminal ends when the tear lines are separated or torn apart.

The static dissipation bag 14H is fabricated from a sleeve of polymeric film having a conductive coating on its exterior side. The open ends of the sleeve are at the top end 19 and bottom end 20A of the bag 14D. The wing 90D, comprising two plies of polymeric material has the plies secured together by adhesive bonding and/or heat-welding which binds the plies of the conductive leads 28 and 34 together and seals the bottom end 20 of the envelope 84. An alligator clip 30 is secured to the free end 38B of the conductive lead 28. In the embodiment shown, the free end 38A has a slit 69 which can be utilized to prepare a loop for the operator conductive lead, as described above with respect to FIGS. 12 and 21. The top 19 of the bag can be heat sealed along seam 24 after the hard drive or other electronic device is packaged in the bag. The top of the bag is cut opened to free or unpackage the hard drive or electronic device.

Figure 29:
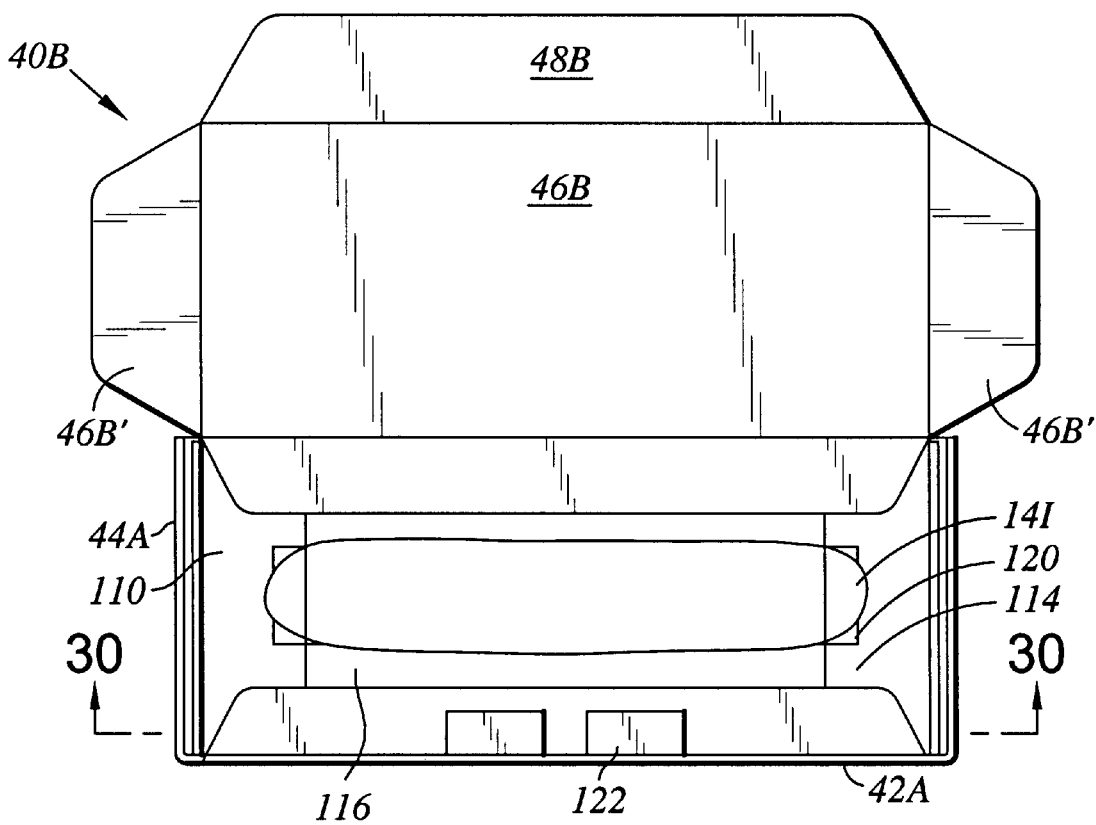
FIG. 29 is a top view of another embodiment of the transportation box of the present invention.
Figure 30:
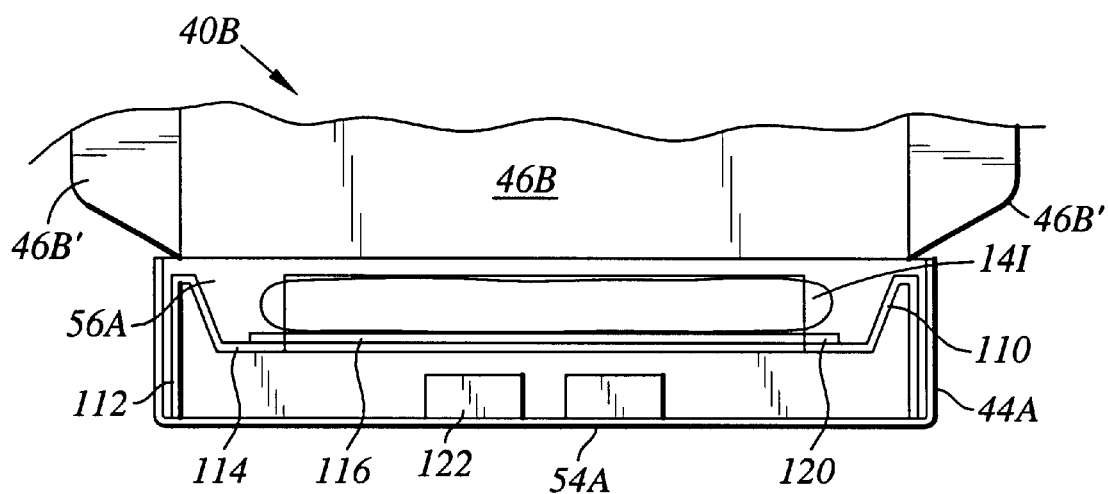
FIG. 30 is a partial front cross-sectional view taken along the lines 30—30 of FIG. 29.
Figure 31:
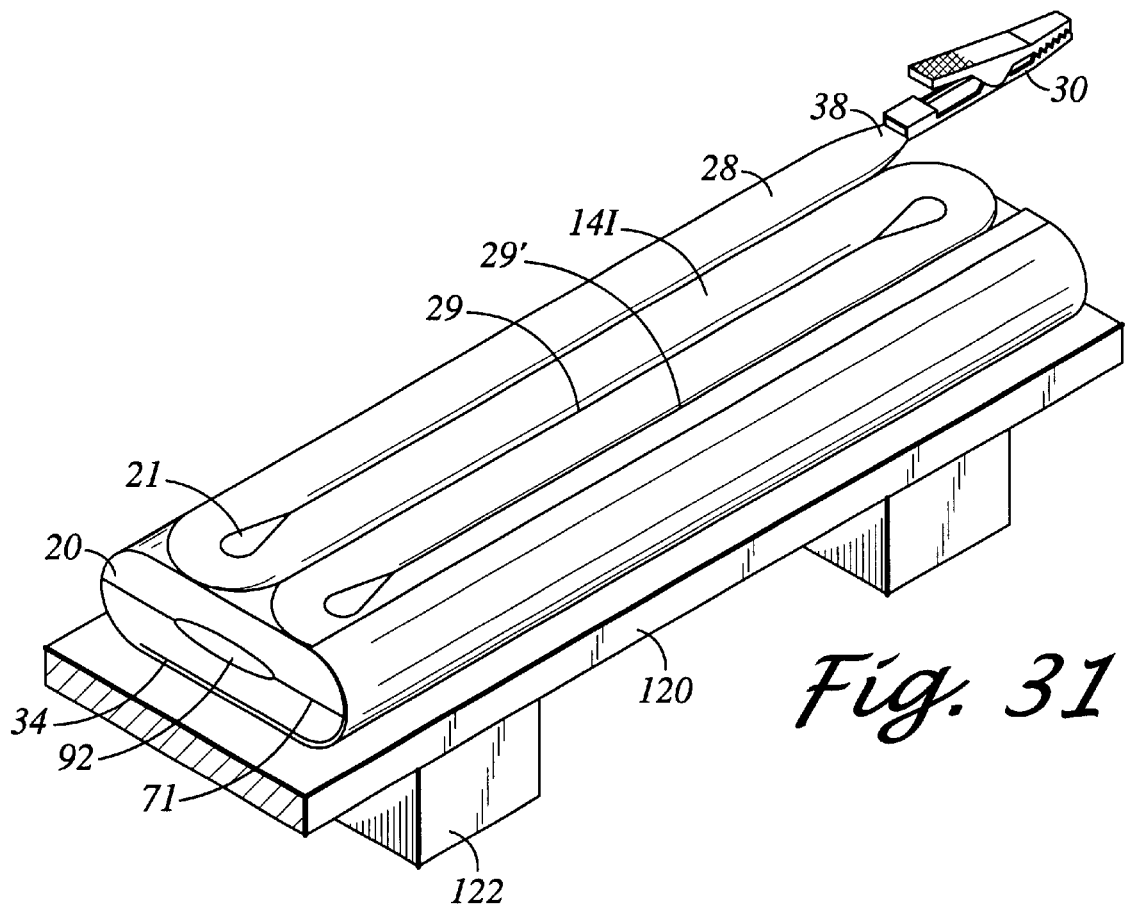
FIG. 31 is a perspective view of another embodiment of the present invention.
Figure 32:
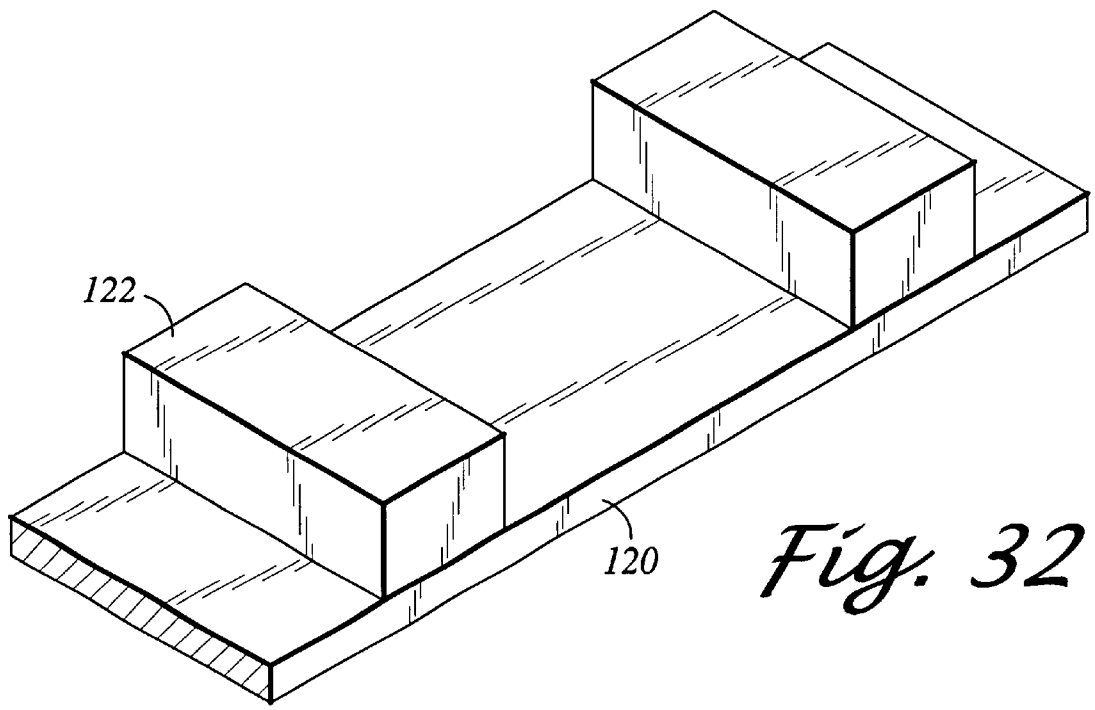
FIG. 32 is a bottom perspective view of the shock-resistant support table of the present invention.

Referring to FIGS. 29 and 30, another embodiment of the shipping container or transportation box 40B is shown. The box is similar to the KORRVU® brand patented shipping box manufactured by Sealed Air Corporation, Chula Vista, Calif. Box 40B has a front wall 42A, side walls 44A, rear wall 56B, bottom wall 54B, and a hinged top wall 46B. The hinged top wall has a front flap 48B and hinged side flaps 46B'. The front flap 48B fits behind the front wall 42A and the side flaps 46B' fit between the inside of the side walls 44B and J-shaped legs 112 of the support element 110. The box and the support element are conveniently made of corrugated cardboard. The support element 110 has a horizontal support 114 supported by J-shaped legs 112 at each end of the horizontal support. A plastic sleeve 116 is secured around the horizontal support to receive the new hard drive or other electronic component and its connecting elements, if any, within a static dissipation bag such as bag 141. The support element, through its J-shaped legs and horizontal support absorbs shocks, protecting the hard drive or other electronic components during shipment and storage. The width of the horizontal support is narrower than the width of the J-shaped legs to provide room in the box for connectors, instructions, and table bases 122, the use of which is explained below. Preferably, the table bases 122 are attached to the table 120 prior to placing the bag and table between the sleeve 116 and the horizontal support 114. In this particular embodiment of the invention, the static dissipation bag 141 and the electronic components therein are supported on the table 120, which is conveniently made of corrugated cardboard. The bag is removably secured to the table with an adhesive or two-sided adhesive tape (not shown).

Although shipping container or transportation boxes 40 and 40A of FIGS. 2–7 can be utilized to transport and store bag 141 with its electronic components, transportation box 40B is more economical because it does not require the sponge layers of boxes 40 and 40A.

Referring to FIGS. 31–35, in this embodiment of the present invention, the static dissipation bag 141 is conveniently prepared from a single-ply sheet of polymeric material, such as Mylar® brand plastic film having a conductive coating, which is; folded on fold line 71 and heat-sealed along seams 22. The wings 90 are also heat-sealed and perforated with tear lines 29 and 29' and relief cutouts 21 at the end of the tear lines 29 and 29', and loop 36A. An opening or hole 92 is cut into the rear edge 20. The opening can be closed off with a piece of releasable adhesive tape, preferably having a conductive coating until the opening is used. The free end 38 of the computer conductive lead 28 has an alligator clamp 30 secured thereto by crimping. The new hard drive 10 with its computer connector assembly 128 attached thereto is inserted into the bag through the open front 24. At least tear lines 29' are torn to permit the open front end 24 to be closed off. The wings and the excess bag material are folded over the top of the bag and the bag is mounted on the table 120 with a releasable adhesive, two-sided adhesive tape, or the like, either applied to the top of the table 120 or to the bottom of the bag. The bag and table 120, preferably with the attached bases 122, are then inserted between the horizontal support 114 of the transportation box 40B and the sleeve 116. See FIGS. 29 and 30. The sleeve keeps the bag and the new hard drive and its computer connector assembly secured on the horizontal support of the support element 110 within the transportation box 40B. The hole 92 can be sealed off with removable conductive adhesive tape. Preferably, a tab 94 is secured to the PCMCIA card with releasable adhesive and the end of the tab extends through the opening 92.

The computer connector assembly 128 comprises PCMCIA card 15A, card edge connector 130, daughter board 132, and the hard drive connector 134. The card edge connector 130 is secured to an extension 124A of the PC board of the PCMCIA card (see FIG. 35). The PCMCIA card 15A has a PCMCIA connector 138 which will connect with a PCMCIA port on a computer. The card edge connector 130 is secured (preferably soldered) to the extension 124A of the PC board 124 of the PCMCIA card and is adapted to receive the daughter board 132 within channel slots 152. The card edge connector 130 has a socket 146 to receive the conductive traces (not shown) at the end 148 of the daughter board. The connections of the socket 146 to the PC board 124 are soldered to the conductive traces (not shown) on the extension 124A. To prevent the daughter board and card edge connector from being separated, the card edge connector has a pinhole 156 adapted to receive lock pin 136 in the daughter board to lock the card edge connector and daughter board together. The lock pin spring locks into hole 156 and can be pushed out the hole 156 from underneath the card edge connector.

Figure 35:
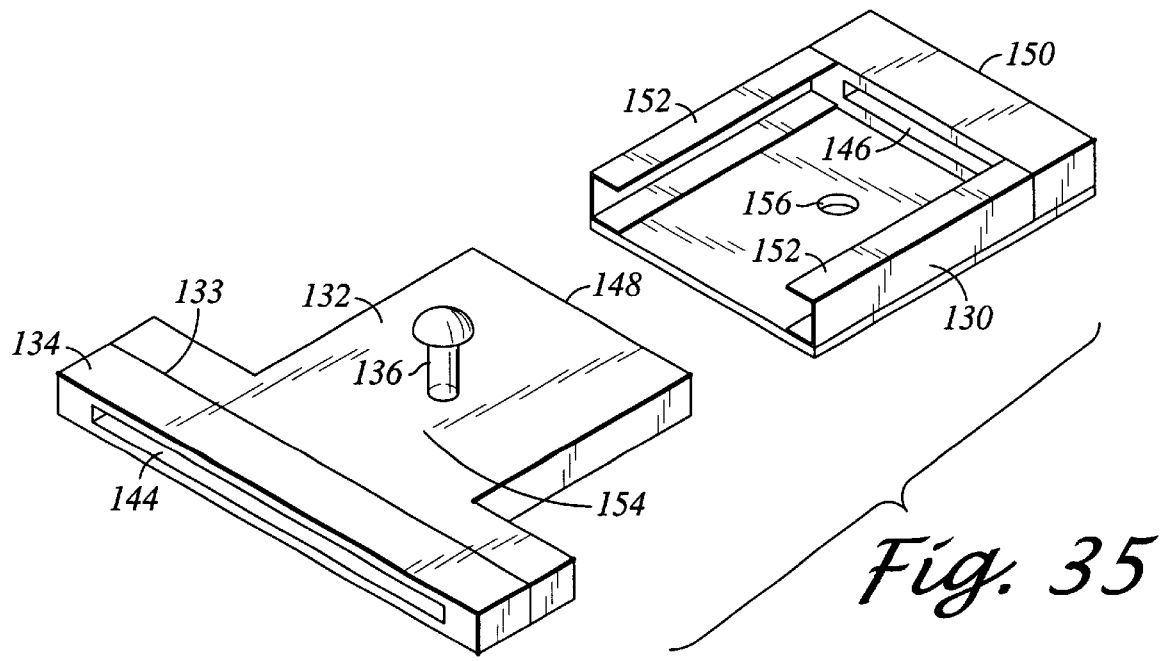
FIG. 35 is an improved universal PCMCIA port/hard drive connector of the present invention.
Figure 36:
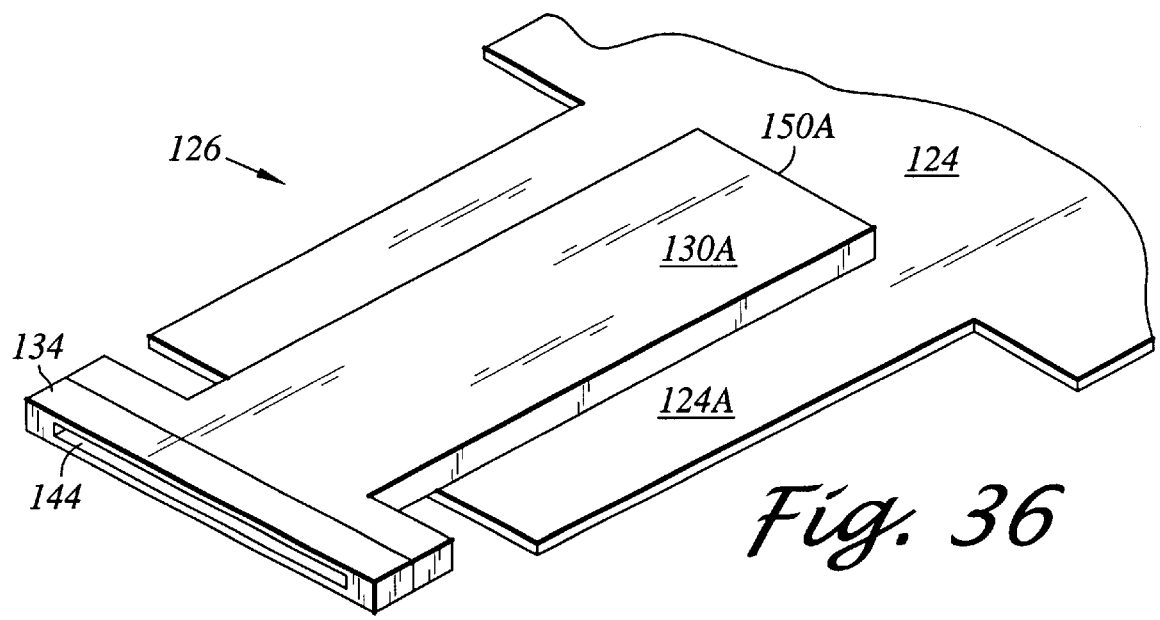
FIG. 36 is a further improved PCMCIA port/hard drive connector of the present invention.

A simpler connector portion 126A of hard drive connector assembly can be used, comprising an adapter card 130A and a hard drive connector 134 (see FIG. 36). The adapter card 130A is secured to extension 124A of the PC board 124 of the PCMCIA card and the connector 134 is secured to the adapter card 1 30A at end 133. The hard drive connector 134 is conveniently soldered to the adapter card 130A and the extension 124A. The principal difference between the connector portion 126A of the hard drive connector assembly shown in FIG. 36 and the connector portion 126 of the hard drive connector assembly 128 shown in FIG. 35 is that the daughter board 132 and the card edge connector 130 have been eliminated and replaced with an adapter card 130A in connector portion 126.

Figure 37:
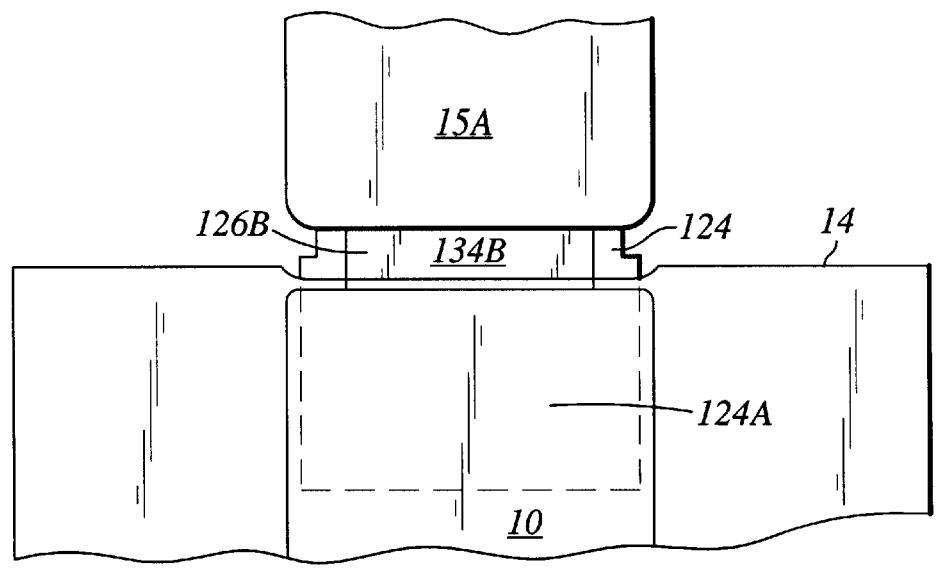
FIG. 37 is a fragmentary top view of another embodiment of FIG. 36.

An even simpler connector portion 126B of a hard drive connector assembly can be used comprising hard drive connector 134B which is connected directly to the PCMCIA card (see FIG. 37). The hard drive connector 134A is secured directly to the extension 124A of the PC board 124 of the PCMCIA card 15A by soldering. This embodiment eliminates the daughter board 132 and the card edge connector of the connector portion 126 shown in FIG. 35 and the adapter card 130A shown in FIG. 36. The combination of hard drive 10, connector portion 126B and PCMCIA card 15A are housed in static dissipation bag 14. The PCMCIA card is extended out of opening 92 in the bag 14 to connect the PCMCIA connector (not shown) on the rear of the PCMCIA card to the PCMCIA port of the computer (not shown).

The combination of a hard drive rigidly but releasably connected to a PCMCIA card with a PCMCIA connector is unique. The combination is not flexible and when supported, as described herein, can be inserted directly into the PCMCIA port of a computer to permit data transfer from the computer to the hard drive and vice versa. This combination, which eliminates the flexible ribbon cable, is compact and eliminates the problems that can be associated with ribbon cables, such as mechanical damage to ribbon cables and electromagnetic interference and electromagnetic susceptibility of ribbon cables. In addition, because this combination is compact, the hard drive, the connector portion 126, 126A, or 126B and the PCMCIA card, and the PCMCIA connector can all be stored within a single static dissipation bag of relatively small size. The combination is almost a monolithic type structure and can be easily grasped through a static dissipation bag in order to connect the hard drive to the computer, to disconnect the hard drive from the computer, to insert or remove the combination from the bag, and to move the combination.

Many computers have their own unique connectors for hard drives. Accordingly, each connector of a hard drive has to be customized to mate to the particular port of a computer into which the hard drive will be installed. Thus, in most cases, computers made by the following manufacturers have different hard drive connectors: Hewlett Packard, Toshiba, Gateway, Compaq, Dell, IBM, Hitachi, Fujitsu, NEC, Micron, Apple, and the like. To save costs and to make manufacturing easier, the hard drive connector assembly 128 of the present embodiment of FIGS. 33 and 34 uses the standard card edge connector 130, and the interchangeable daughter boards 132 having customized hard drive connectors 134 which are soldered onto the ends of the daughter boards.

Figure 33:
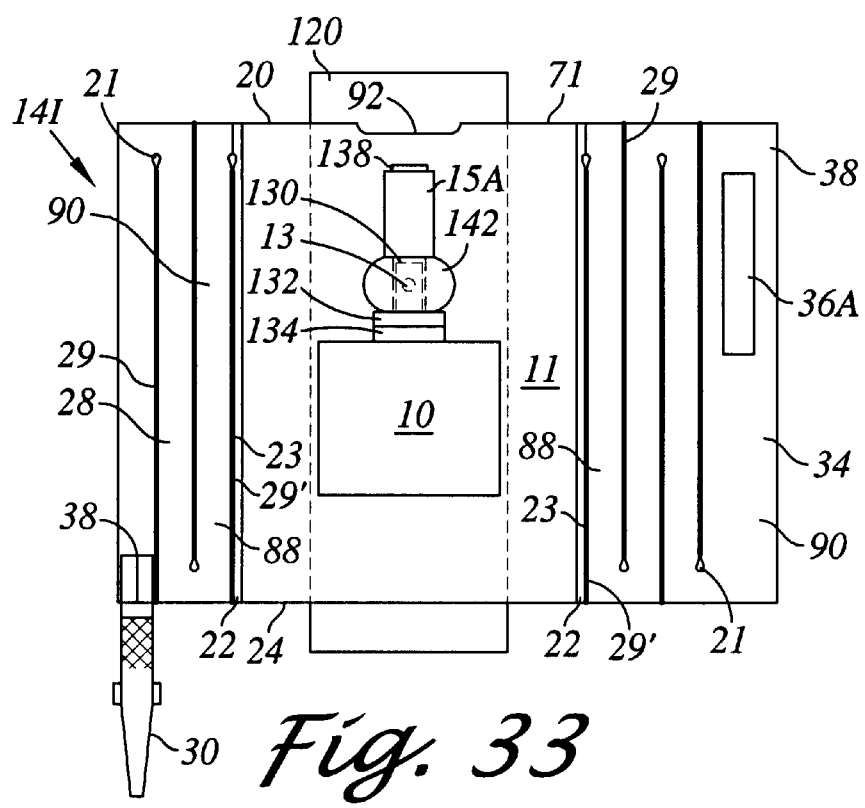
FIG. 33 is a top view of another embodiment of the present invention.
Figure 34:
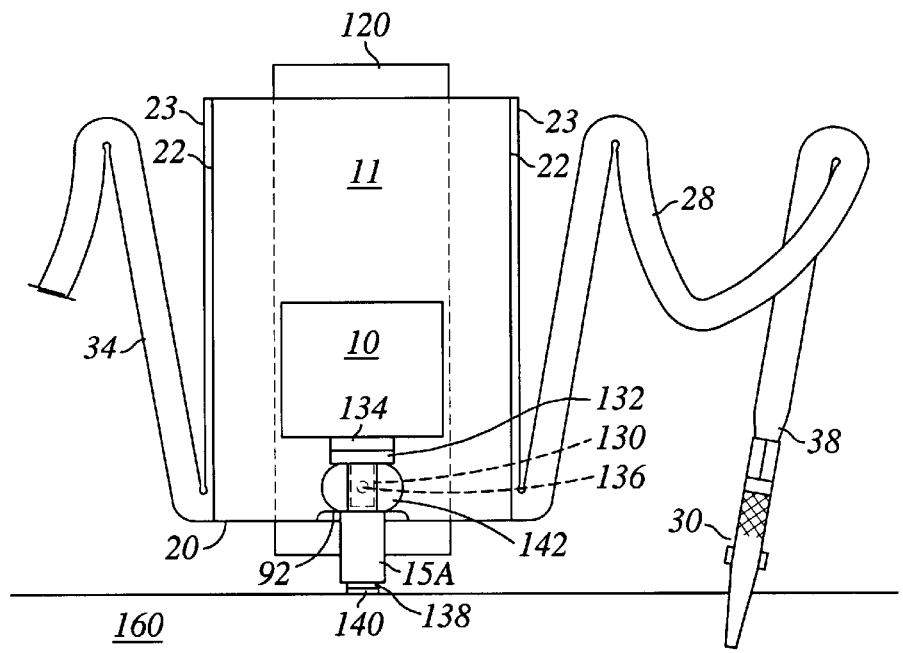
FIG. 34 is another top cross-sectional view of the embodiment of FIG. 33.

Referring to FIGS. 33 and 34, the hard drive connector assembly 128 will be connected to the new hard drive 10 as a unit comprising the PCMCIA card 15A, the card edge connector 130, the daughter board 132, and the hard drive connector 134 (see FIGS. 33 and 34). The sequence of the assembly steps of the new hard drive with the components of the hard drive connector assembly 128 does not appear to be critical.

To protect the operation of the hard drive connector assembly during data transfer, as is explained below, an antistatic polymeric collar 142 is secured around the card edge connector and daughter board as shown in FIGS. 33 and 34 or around the adapter card 130A when used in place of card edge connector 130 and daughter board 132 or around hard drive connector 134A when used in place of connector portions 126 and 126A. The diameter of the sleeve is greater than the width of the hole 92 for reasons which will become apparent below. When the operator desires to install the new hard drive into the computer, the operator opens the transportation box 40B and removes the static dissipation bag 14l enclosing the new hard drive 10 and the hard drive connector assembly 128 from the support 110. The table bases 122 can be then secured to the bottom of the table 120 if not secured before. The table bases can be sponge blocks having adhesive layer on one side protected by a release membrane. The release membrane is removed to expose the adhesive layer which is applied against the under surface of the table. Preferably, the table 120 has the bases 122 mounted thereon when the bag is mounted on the table. The table can be supported by one large base or two or three smaller bases.

Conveniently, the table is made of corrugated cardboard although other materials can be used. The operator then tears tear lines 29, if they have not previously been torn, to free the operator conductive lead 34 and the computer conductive lead 28. The operator passes his or her hand through the loop 36A to ground the operator to the static dissipation bag and connects the computer conductive lead 28 to the computer chassis to ground the bag to the computer 160.

The operator then can open the open front end 24 of the bag and slide the hard drive and the hard drive connector assembly to the rear end of the bag so that the PCMCIA card emerges from the hole 92. Alternatively, the operator can manipulate movement of the hard drive assembly through the bag to slide the PCMCIA card out of hole 92. Preferably, the new hard drive and hard drive connector assembly is packaged with the tab 94 releasably secured to the PCMCIA card extending out of the opening 92. The tab is pulled to pull the PCMCIA card 15A through the opening 92. The tab is then pulled free of the PCMCIA card. The antistatic polymeric collar 142. prevents the remainder of the hard drive connector assembly and new hard drive from being pulled or pushed any further through hole 92. The grounded operator then connects the PCMCIA connector 138 to the PCMCIA port 140 on the computer 160. The PCMCIA port 140 is normally on the back or side of the computer. The PCMCIA port is standard but the location and the height of the port on the computer varies from computer to computer, and manufacturer to manufacturer. The location and height of the PCMCIA port is known for a specific model of a computer, and the height of the table base 122 is dimensioned such that the table 120 with table bases 122, the new hard drive 10 and the hard drive connector assembly 128, which are housed within the static dissipation bag 14l, will be at the proper height for connection of the PCMCIA connector 138 of the PCMCIA card 15A to the PCMCIA port 140 of the computer 160. Thus, the PCMCIA connector and PCMCIA port will be on the same horizontal plane.

After the connection is made between the new hard drive and the computer via the PCMCIA port, the necessary data transfer from the existing hard drive on the computer to the new hard drive is carried out, as described above. When the data transfer is complete, the PCMCIA connector is disconnected from the PCMCIA port and the computer chassis is opened. The new hard drive 10 and the connected hard drive connector assembly is removed from the central chamber 11 of the static dissipation bag 14l and placed on top of the bag grounded to the computer and operator. The hard drive connector assembly is removed from the new hard drive and left on the surface of the bag. The old hard drive, assuming that it is to be replaced by the new hard drive, is removed from the computer and placed on the bag. The new hard drive is installed in the computer. The computer chassis can then be closed. The old hard drive is connected to the hard drive connector assembly, and the combination is placed into the central chamber of the bag through the open front end 24, and open front end is closed off. At this stage, the computer conductive lead 28 can be disconnected from the computer chassis and operator conductive lead 34 can be removed from the wrist or hand of the operator. The bag with the enclosed hard drive and the computer connector assembly, which is mounted on the table 120 with the secured table bases 122, is placed between the sleeve 116 and the support 110 in the transportation box 40B and the box is closed.

Conveniently, the box is made in dimensions such that the bag, table, and table bases can be inserted into the sleeve 116. The box normally will have sufficient height so that there is clearance between the top of the bag with the hard drive, etc. in the sleeve and the hinged top wall of the transportation box.

The old hard drive with the connected hard drive connector assembly can be used as a backup. For backup, the old hard drive with the hard drive connector assembly in the static dissipation bag 14l mounted on the table 120, with the table bases 122, is removed from the transportation box, which now functions as a storage box. The front open end 24 of the bag can be opened to push the old hard drive and the connected hard drive connector assembly to the rear edge of the bag so that the PCMCIA card 15A extends from the hole 92. If this is done, preferably the operator conductive lead 34 is attached to the operator. Alternatively, the connector assembly is pushed to the rear edge of the bag through the polymeric material making up the bag so that the PCMCIA card is pushed through the hole 92. After the PCMCIA card is pushed through the hole 92, the PCMCIA connector 138 of the PCMCIA card is connected to the PCMCIA port of the computer and a backup operation is carried out. Preferably, the operator, the bag and computer are grounded to each other with the conductive leads 28 and 34 during this operation. After the data transfer is made, the PCMCIA connector is disconnected from the PCMCIA port and the old hard drive with the connected hard drive connector assembly is pulled back into the bag through the open front end 24 or manipulated and pushed back towards the front of the bag by manipulating the old hard drive through the bag of polymeric material. The conductive leads 28 and 34 are removed. The bag with the enclosed hard drive and the attached table and table bases is inserted into sleeve 116 of the transportation box. The box is closed. Access can be easily gained to the old hard drive if the backup information is required, or if additional backup is required in the future.

In the embodiments of the invention shown in FIGS. 29–37, the requirement for a connector cable has been eliminated. The hard drive is connected directly to the PCMCIA port of the computer through the hard drive connector assembly. To prevent separation of the card edge connector 130 from the daughter board connector 132 in hard drive connector assembly 128 (FIGS. 29–35), the two elements are preferably locked together with a lock pin 136 extending through connector plate 154. The pin is pushed into pinhole 156 in the base of the card edge connector 130. To disassemble the card edge connector from the daughter board connector, the pin is pulled from hole 156. The two elements could also be locked using a self-locking card edge connector. The connector portions 126A and 126B do not require a locking device since the daughter board has been eliminated in these embodiments.

The above invention has been described with regard to particular embodiments. However, it is to be recognized that other embodiments and objectives of the present invention are contemplated as part of the invention by the inventors. The improved static dissipation bag can be used for any item that is to be protected from static charge, including computer memory, photomasks, scientific instruments, explosive devices and the like. The present components and process meet two principal objectives that are of concern to those who install new hard drives after a data transfer, namely, (1) dissipation of static charge to prevent electrostatic discharge which can damage the hard drive, the data on the hard drive, the computer or the computer components, and (2) minimizing mechanical shock to the hard drive when the hard drive is receiving data from the computer.

We claim:

1. An improved method of installing a new hard drive in a computer comprising the steps of packaging a new hard drive with a connected hard drive connector assembly having a hard drive PCMCIA connector in a static dissipation bag having a conductive coating on its exterior surface; grounding the static dissipation bag by connecting the bag to the computer and to an operator, extending the PCMCIA connector outside the bag, connecting the new hard drive via the PCMCIA connector to the PCMCIA or equivalent port of a computer, transferring the data on the existing hard drive in the computer to the new hard drive while the new hard drive is packaged in the static dissipation bag disconnecting the PCMCIA connector from the PCMCIA or equivalent port after the data transfer is complete, removing the new hard drive from the static dissipation bag, disconnecting the hard drive connector assembly from the new hard drive, and installing the new hard drive in the computer.

2. The method according to claim 1 wherein the new hard drive is replacing the existing hard drive on the computer.

3. The method according to claim 2 wherein the new hard drive is placed on the surface of the grounded static dissipation bag after the hard drive connector assembly is disconnected and the existing hard drive is then removed from the computer and placed on the surface of the grounded static dissipation bag prior to installing the new hard drive in the computer.

4. The method according to claim 3 wherein the existing hard drive is connected to the hard drive connector assembly and packaged in the static dissipation bag after installation of the new hard drive in the computer.

5. The method according to claim 4 wherein the packaged existing hard drive is boxed in a transportation box.

6. The method according to claim 4 wherein the existing hard drive and connected hard drive connector assembly is packaged in the static dissipation bag by the operator after removal of the existing hard drive from the computer.

7. The method according to claim 6 wherein the packaged existing hard drive is boxed in a transportation box.

8. The method according to claim 1 wherein the hard drive connector assembly comprises a PCMCIA card having a PCMCIA connector for a PCMCIA port on a computer and a hard drive connector to connect the PCMCIA card to the new hard drive, and the static dissipation bag having an opening whereby the PCMCIA connector can be extended through to connect to the PCMCIA port of a computer.

9. The method according to claim 8 wherein the new hard drive and connected hard drive connector assembly can be manipulated within the static dissipation bag to extend the PCMCIA connector in and out of the opening in the static dissipation bag.

10. The method according to claim 8 wherein the PCMCIA connector is connected to the PCMCIA or equivalent port of the computer to effect the data transfer from the existing hard drive to the new hard drive.

11. The method according to claim 10 wherein the PCMCIA connector is disconnected from the PCMCIA or equivalent port after the data transfer from the existing hard drive.

12. The method according to claim 8 wherein the PCMCIA connector of the hard drive connector assembly is connected to the PCMCIA or equivalent port of a computer, transferring the data of at least one of the hard drives in the computer to the existing hard drive while the existing hard drive is packaged in the static dissipation bag and disconnecting the PCMCIA connector from the PCMCIA or equivalent port after the data transfer is complete.

13. The method according to claim 12 wherein the static dissipation bag is grounded to the computer and the operator prior to the data transfer step.

14. An improved method of backing up a computer comprising the steps of packaging a hard drive with a connected hard drive connector assembly having a PCMCIA connector in a static dissipation bag having a conductive coating on its exterior surface; mounting the packaged hard drive on an elevated table, extending the PCMCIA connector out of the bag, connecting the PCMCIA connector of the hard drive connector assembly to the PCMCIA or equivalent port of a computer, transferring the data from the computer to the hard drive while the hard drive is packaged in the static dissipation bag and the bag is mounted on the elevated table, and disconnecting the PCMCIA connector from the PCMCIA or equivalent port after the data transfer is complete.

15. The method according to claim 14 wherein the static dissipation bag is grounded to the computer and the operator prior to connecting the PCMCIA connector to the PCMCIA or equivalent port.

16. The method according to claim 14 wherein the PCMCIA connector of the hard drive connector assembly extends out of a hole in the static dissipation bag when connected to the PCMCIA or equivalent port.

17. The method according to claim 14 wherein the height of the PCMCIA connector above a support surface is approximately the height of the PCMCIA or equivalent port when the computer is on the support surface because the hard drive and hard drive connector assembly are mounted on an elevated table to provide such height.

* * * * *